(12) United States Patent
Hino

(10) Patent No.: US 9,519,134 B2
(45) Date of Patent: Dec. 13, 2016

(54) OPTICAL DEVICE AND IMAGE DISPLAY APPARATUS

(71) Applicant: Seiko Epson Corporation, Tokyo (JP)

(72) Inventor: Makiko Hino, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/668,115

(22) Filed: Mar. 25, 2015

(65) Prior Publication Data

US 2015/0277104 A1  Oct. 1, 2015

(30) Foreign Application Priority Data

Mar. 27, 2014 (JP) ................................. 2014-065412

(51) Int. Cl.
*G02B 26/08* (2006.01)
*G02B 26/10* (2006.01)
*H04N 9/31* (2006.01)

(52) U.S. Cl.
CPC ............ *G02B 26/08* (2013.01); *G02B 26/085* (2013.01); *G02B 26/0816* (2013.01); *G02B 26/0875* (2013.01); *G02B 26/10* (2013.01); *G02B 26/105* (2013.01); *H04N 9/3129* (2013.01)

(58) Field of Classification Search
CPC ... G02B 26/08; G02B 26/0816; G02B 26/085; G02B 26/0875; G02B 26/10; G02B 26/105; H01N 9/3129
USPC .......... 359/199.3, 200.2, 200.7, 214.1, 221.4
See application file for complete search history.

(56) References Cited

U.S. PATENT DOCUMENTS

| | | | | |
|---|---|---|---|---|
| 5,066,084 A | * | 11/1991 | Culp ..................... | G02B 26/10 359/196.1 |
| 7,922,332 B2 | * | 4/2011 | Utagawa ............ | G03B 21/2073 353/20 |
| 2009/0040464 A1 | * | 2/2009 | Utagawa ............ | G03B 21/2073 353/20 |
| 2012/0062970 A1 | * | 3/2012 | Yamada ............... | G02B 7/1821 359/199.4 |
| 2012/0162740 A1 | * | 6/2012 | Yamada ............... | G02B 26/101 359/221.2 |
| 2013/0321889 A1 | * | 12/2013 | Mizoguchi ........... | G02B 26/101 359/199.3 |

(Continued)

FOREIGN PATENT DOCUMENTS

| | | |
|---|---|---|
| JP | 2005-156684 A | 6/2005 |
| JP | 2008-304667 A | 12/2008 |

(Continued)

*Primary Examiner* — Frank Font
(74) *Attorney, Agent, or Firm* — Harness, Dickey & Pierce, P.L.C.

(57) ABSTRACT

An optical device includes: an optical member which is formed of a plate-shaped part and on which light is incident; a frame so provided that the frame surrounds side surfaces of the optical member and made of an elastic material more elastic than the optical member; a shaft that supports the optical member and the frame in a swingable manner and is made of the elastic material; a support that supports the shaft; a first restricting member provided on a plate surface of the optical member; and a second restricting member that is provided in a position separate from the optical member and comes into contact with the first restricting member when the optical member and the frame swing.

20 Claims, 15 Drawing Sheets

(56) References Cited

U.S. PATENT DOCUMENTS

2014/0168751 A1* 6/2014 Suzuki .................. G02B 26/08
359/291

FOREIGN PATENT DOCUMENTS

| JP | 2011-158589 A | 8/2011 |
| JP | 2011-215326 A | 10/2011 |
| JP | 2012-013766 A | 1/2012 |
| WO | WO-2011-125494 A1 | 10/2011 |

* cited by examiner

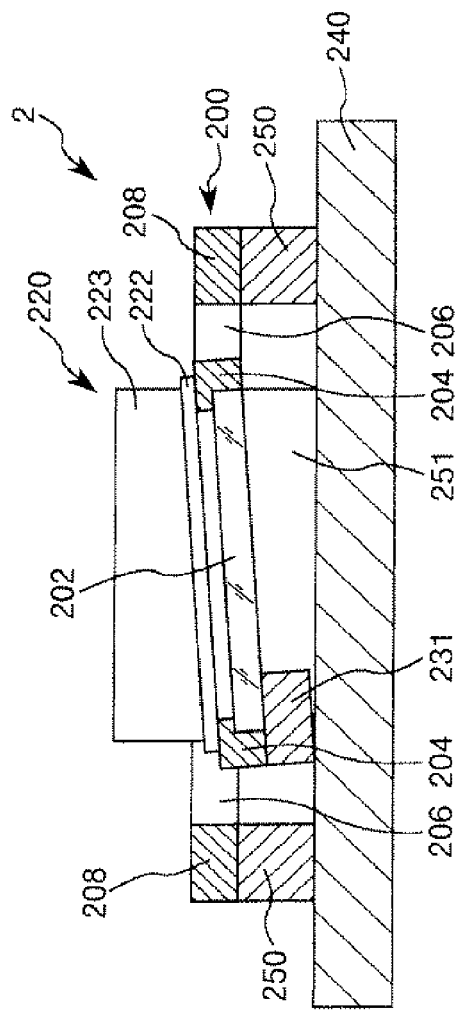
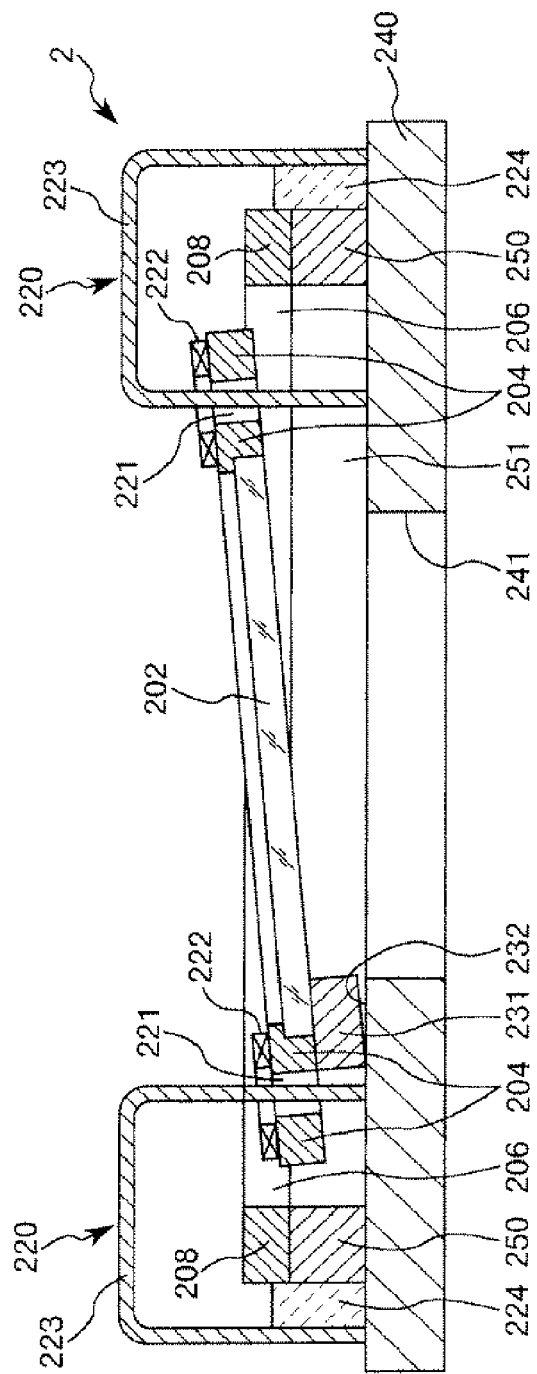
FIG. 7A
FIG. 7B

OPTICAL DEVICE AND IMAGE DISPLAY APPARATUS

BACKGROUND

1. Technical Field

The present invention relates to an optical device and an image display apparatus.

2. Related Art

A projector, a head-mounted display, and other apparatus are used as an image display apparatus that includes an image forming device having two-dimensionally arranged pixels, produces an image by controlling the wavelength, the intensity, and other factors of light on a pixel basis in the image forming device, and enlarges and displays the image through a lens or any other optical system. A liquid crystal device and an organic EL device are, for example, used as the image forming device, and these devices have been improved in terms of resolution year after year.

At present, in the image display apparatus market, products having very high resolution or what is called full-high-vision resolution are widely used. It is expected that the current image display apparatus transitions in the future to products having still higher resolution called, for example, 4K and 8K (super-high-vision resolution).

Among methods for achieving such high-resolution display, there is a method using a pixel shifter that shifts the position where an image produced by an image forming device is projected. An example of the pixel shifter uses refraction (light modulation) in an optical element to shift the optical path. The optical element is configured to be rotatable around an axis, and the rotation of the optical element causes light passing therethrough to be refracted, resulting in a shift of the optical path. Further, in this process, the amount of shift can be adjusted in accordance with the amount of rotation.

In the pixel shifter described above, which shifts the optical path based on the rotation of the optical element, an unnecessary vibration component other than the rotation of the optical element that shifts the optical path (such as residual vibration produced when the optical element stops rotating or when the direction of the rotation changes) makes the optical path unstable, resulting in a decrease in quality of a displayed image.

JP-A-2011-158589 discloses an optical path control apparatus (pixel shifter) that shifts the optical path based on rotation of an optical element and also discloses that vibration other than the rotation of the optical element is suppressed. The optical path control apparatus described in JP-A-2011-158589 has, however, a problem of a complicated control circuit because unnecessary vibration is suppressed based on drive control of the rotation of the optical element.

SUMMARY

An advantage of some aspect of the invention is to provide an optical device having a simple configuration but capable of preventing occurrence of unnecessary vibration other than rotation of an optical member and to further provide an image display apparatus including the optical device and capable of performing high-image-quality display.

The invention can be implemented in the form of the following application examples.

An optical device according to an application example of the invention includes an optical member which is formed of a plate-shaped part and on which light is incident, a frame so provided that the frame surrounds side surfaces of the optical member and made of an elastic material more elastic than the optical member, a shaft that supports the optical member and the frame in a swingable manner and is made of the elastic material, a support that supports the shaft, a first restricting member provided on a plate surface of the optical member, and a second restricting member that is provided in a position separate from the optical member and comes into contact with the first restricting member when the optical member and the frame swing.

The configuration described above in which the first restricting member and the second restricting member come into contact with each other allows attenuation of produced vibration of the optical member, whereby the optical device achieved in the present application example, which has a simple configuration, can prevent occurrence of unnecessary vibration other than rotation of the optical member.

In the optical device according to the application example of the invention, it is preferable that the first restricting member is provided in a position where the first restricting member overlaps with both the optical member and the frame when viewed in a direction perpendicular to the plate surface.

The configuration in which the first restricting member and the second restricting member come into contact with each other allows attenuation of produced vibration of both the optical member and the frame, whereby occurrence of unnecessary vibration of the optical member can be more reliably suppressed.

In the optical device according to the application example of the invention, it is preferable that the elastic material is a material primarily containing a resin.

In the configuration described above, since the elasticity of the elastic material can be sufficiently greater than the elasticity of the material of which the optical member is made, conversion of stress produced in the frame into unnecessary vibration of the optical member is avoided when the attitude of the optical member is changed.

In the optical device according to the application example of the invention, it is preferable that magnetic force produced between the first restricting member and the second restricting member induces swing motion of the optical member and the frame.

In the configuration described above, since the first restricting member and the second restricting member further have a function of driving the optical member and the frame, the number of parts of the optical device can be reduced, whereby the structure of the optical device can be simplified. As a result, the optical device can be more readily manufactured at a reduced cost.

In the optical device according to the application example of the invention, it is preferable that the first restricting member includes a permanent magnet, and that the second restricting member includes an electromagnet.

In the configuration described above, magnetic interaction produced between the permanent magnet and the electromagnet can induce swing motion of the optical member and the frame.

An optical device according to another application example of the invention includes an optical member which is formed of a plate-shaped part and on which light is incident, a frame so provided that the frame surrounds side surfaces of the optical member and made of an elastic material more elastic than the optical member, a shaft that supports the optical member and the frame in a swingable manner and is made of the elastic material, a support that supports the shaft, and a restricting member that is provided in a position separate from the optical member and comes into contact with the optical member when the optical member and the frame swing.

The configuration described above in which the restricting member and the optical member come into contact with each other allows attenuation of produced vibration of the optical member, whereby the optical device achieved in the present application example, which has a simple configuration, can prevent occurrence of unnecessary vibration other than rotation of the optical member.

In the optical device according to the application example of the invention, it is preferable that the restricting member comes into contact with the frame when the optical member and the frame swing.

In the configuration described above, since impact produced at the time of the contact is unlikely to directly propagate to the optical member, whereby produced unnecessary vibration of the optical member can be more reliably suppressed.

In the optical device according to the application example of the invention, it is preferable that the optical member transmits light.

In the configuration described above, the direction in which light allowed to pass through the optical member is deflected and the amount of deflection can be controlled by changing the attitude of the optical member in such a way that the angle of incidence of the light incident on the optical member has a target value.

In the optical device according to the application example of the invention, it is preferable that the optical member reflects light.

In the configuration described above, the direction in which light reflected off the optical member is deflected and the amount of deflection can be controlled by changing the attitude of the optical member in such a way that the angle of incidence of the light incident on the optical member has a target value.

An image display apparatus according to still another application example of the invention includes the optical device according to the application example of the invention.

Since the first restricting member and the second restricting member come into contact with each other in the optical device to attenuate produced vibration of the optical member, the configuration described above, which is simple, can prevent occurrence of unnecessary vibration of the optical member. As a result, the amount of shift of an image shifted by the optical device is likely to be uniquely determined.

In the image display apparatus according to the application example of the invention, it is preferable that the optical device changes the position of an optical path of light that exits out of the optical device so that the position of a pixel displayed when irradiated with the light is shifted.

In the configuration described above, the amount of shift of an image shifted by the optical device is likely to be uniquely determined. As a result, in the image display apparatus achieved in the present application example, for example, the resolution of a displayed image is increased and a decrease in the degree of high definition of the image due to unnecessary vibration of the optical device is suppressed.

In the image display apparatus according to the application example of the invention, it is preferable that the optical device preferably scans an object with the light to form an image.

In the configuration described above, the scan position on the object, which is scanned by the optical device with the light, can be exactly controlled, whereby the image display apparatus achieved in the present application example has excellent drawing characteristics.

BRIEF DESCRIPTION OF THE DRAWINGS

Embodiments of the invention will be described with reference to the accompanying drawings, wherein like numbers reference like elements.

FIGS. 7A and 7B show how the optical path deflecting device shown in FIGS. 5A, 5B, and 6 operates.

DESCRIPTION OF EXEMPLARY EMBODIMENTS

An optical device and an image display apparatus will be described below in detail based on preferable embodiments shown in the accompanying drawings.

First Embodiment

Projector

A description will first be made of an optical path deflecting device using an optical device according to a first embodiment of the invention and a projector using an image display apparatus according to the first embodiment of the invention.

Figure 1:
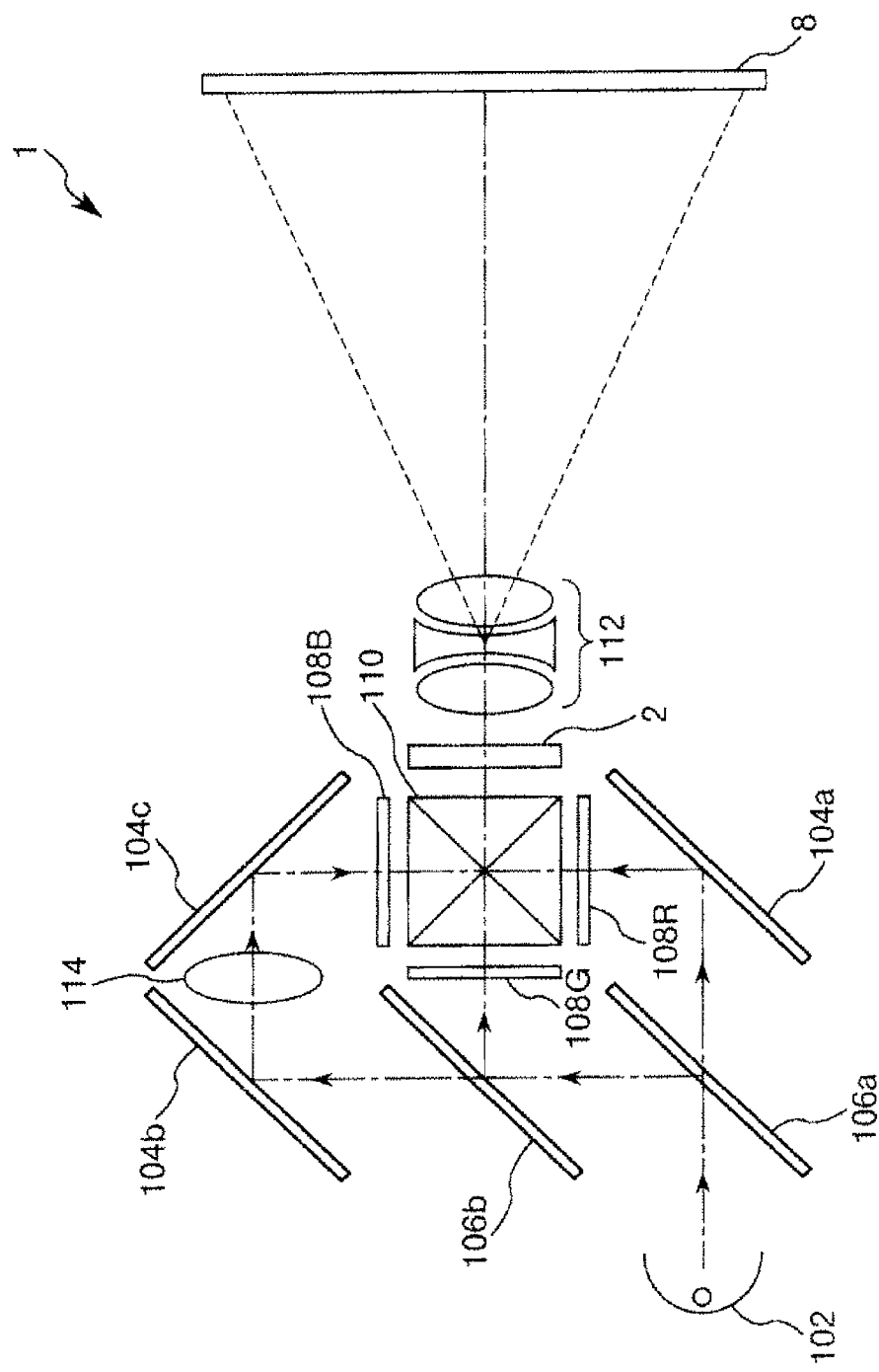
FIG. 1 shows the optical configuration of a projector using an image display apparatus according to a first embodiment of the invention.
Figure 2:
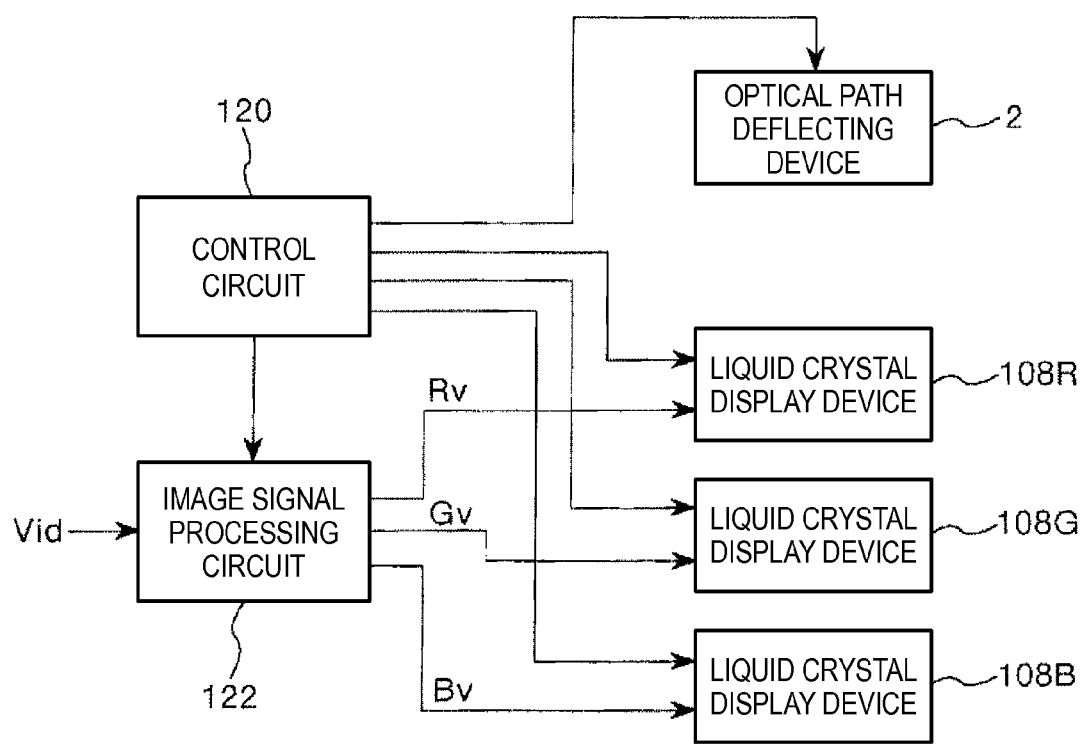
FIG. 2 is a block diagram showing the electrical configuration of the projector shown in FIG. 1.
Figure 3:
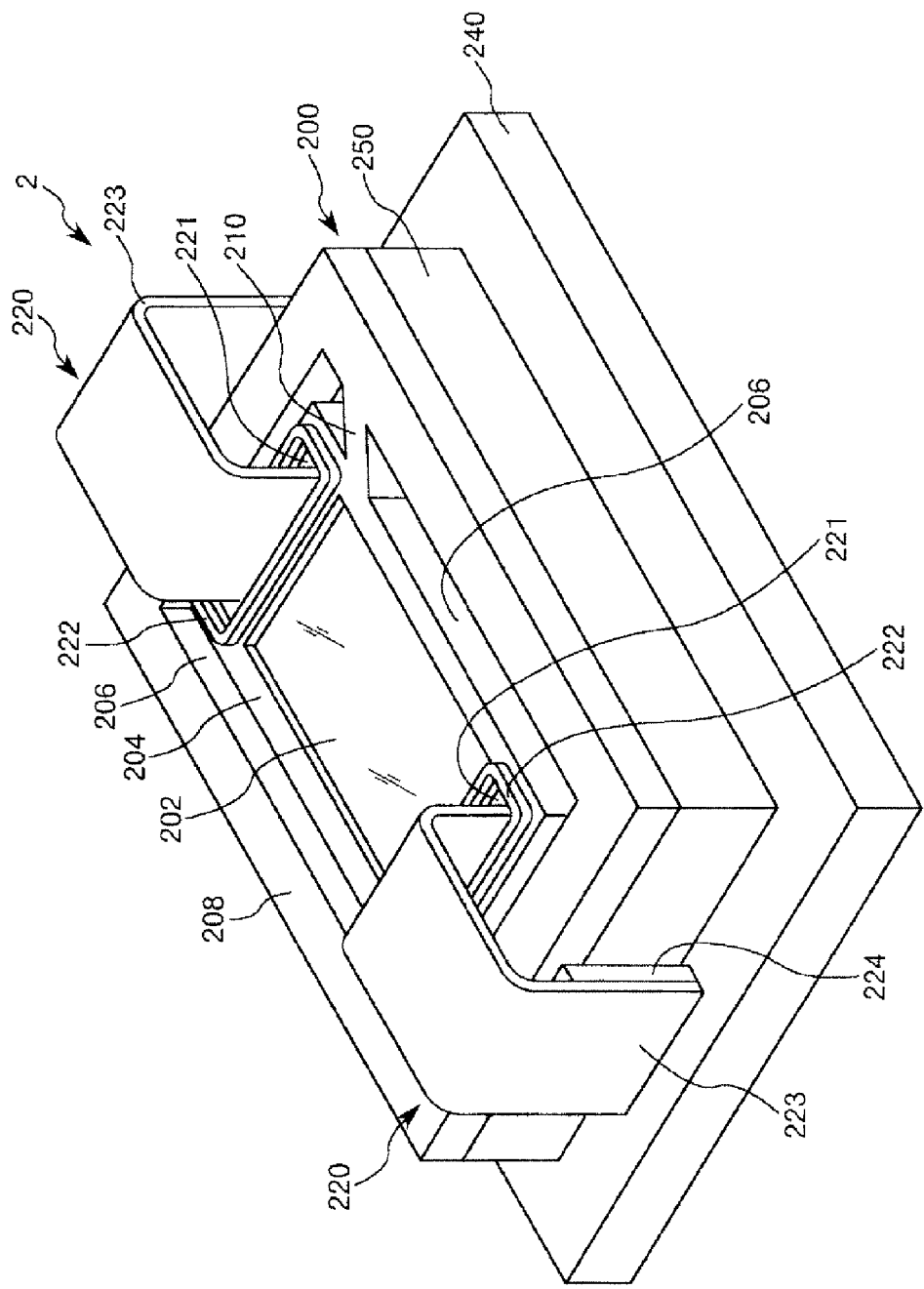
FIG. 3 is a perspective view showing the configuration of an optical path deflecting device shown in FIG. 1 (optical device according to the first embodiment of the invention).
Figure 4:
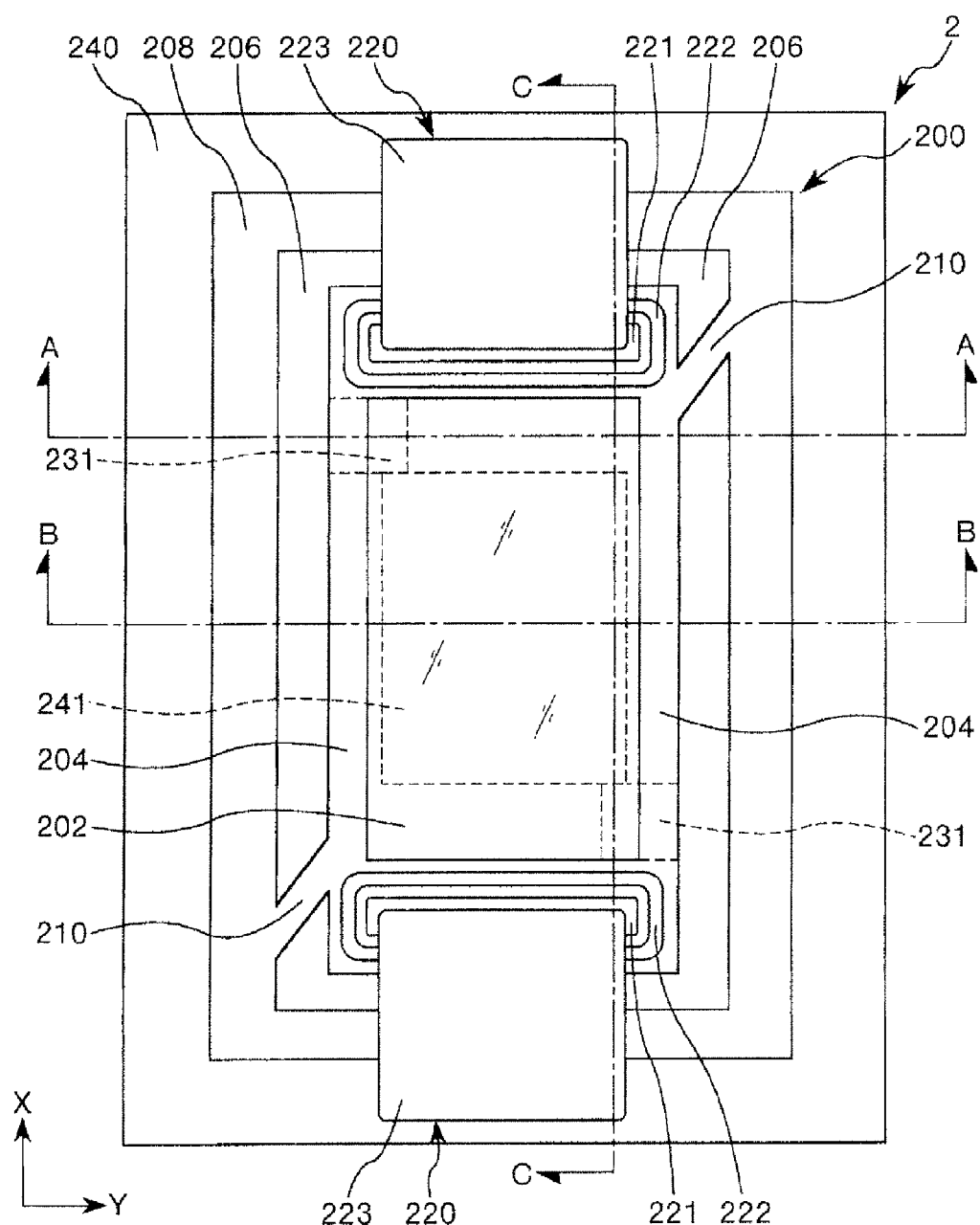
FIG. 4 is a plan view of the optical path deflecting device shown in FIG. 3.
Figure 5A:
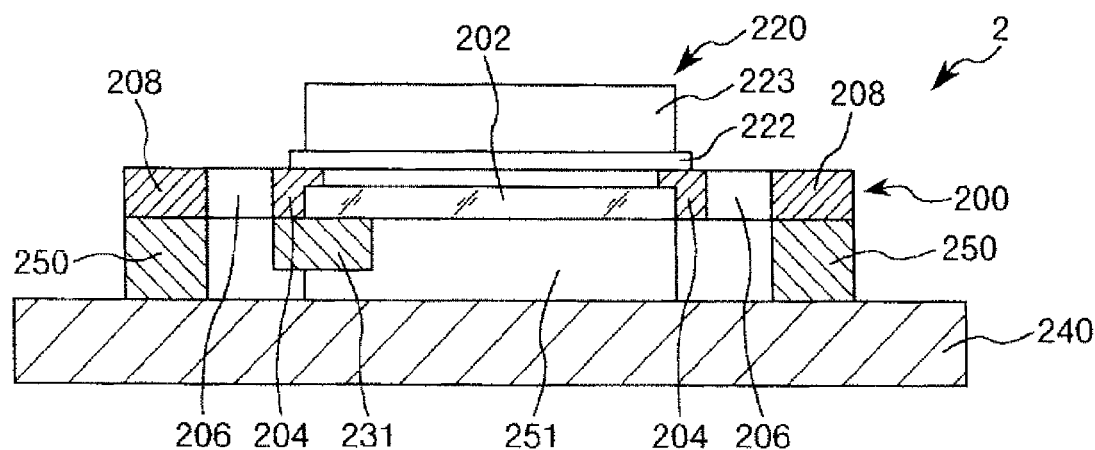
FIG. 5A is a cross-sectional view taken along the line A-A in FIG. 4.
Figure 5B:
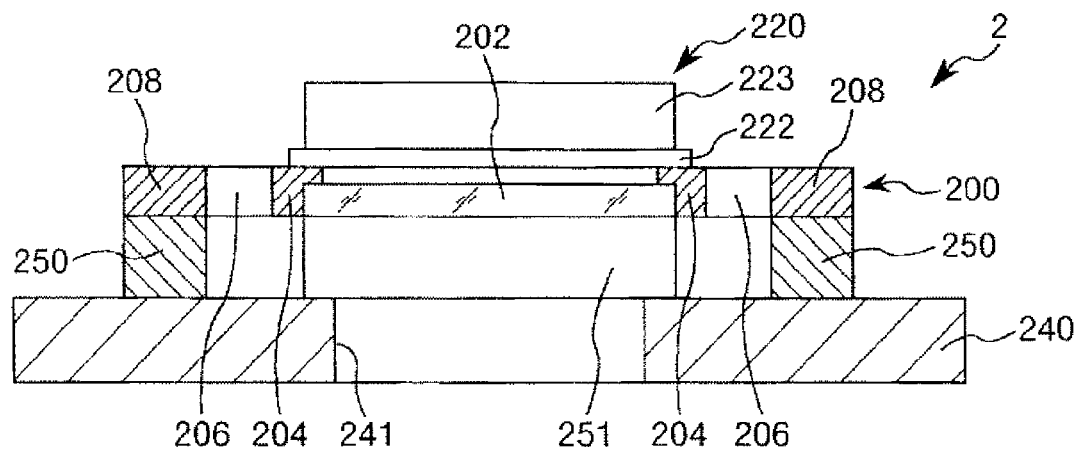
FIG. 5B is a cross-sectional view taken along the line B-B in FIG. 4.
Figure 6:
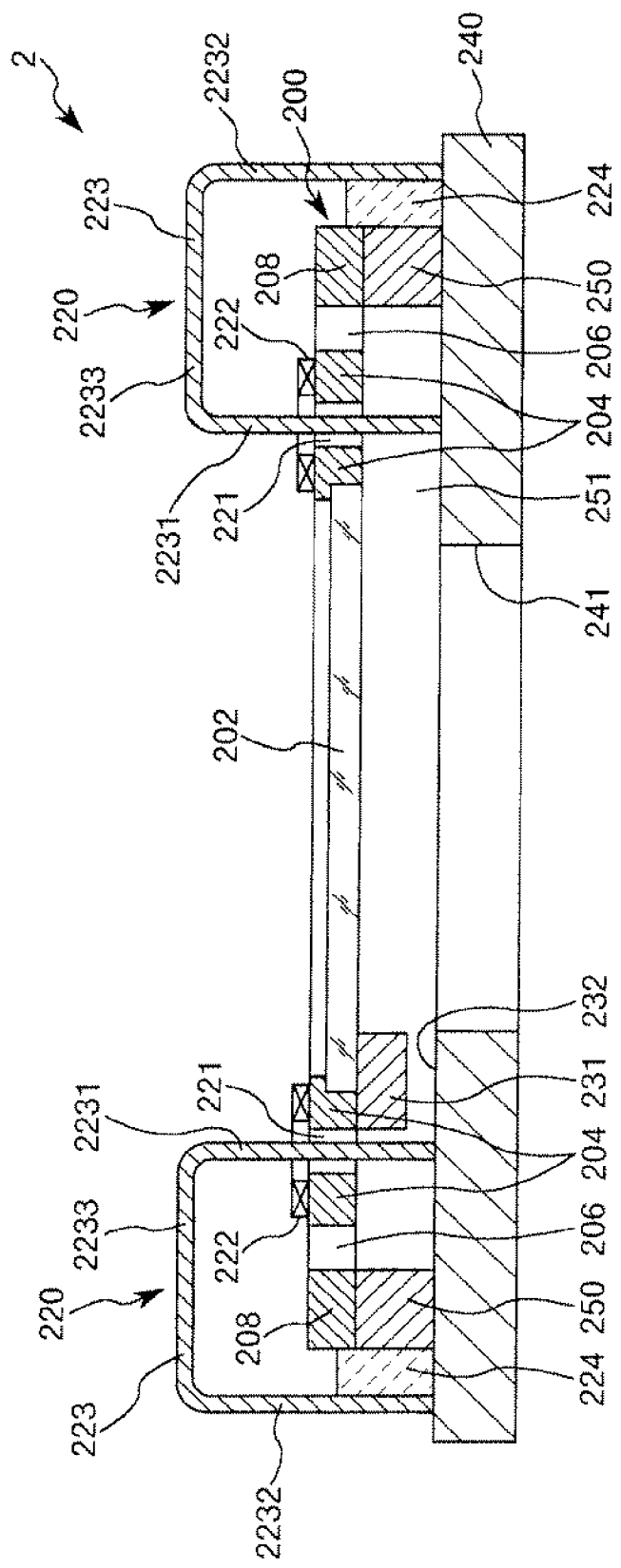
FIG. 6 is a cross-sectional view taken along the line C-C in FIG. 4.
Figure 8:
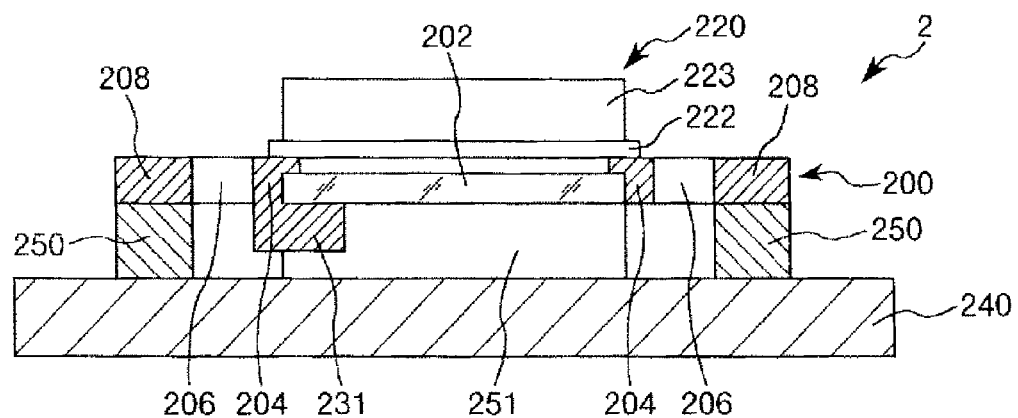
FIG. 8 is a cross-sectional view of an example of another configuration of the optical path deflecting device shown in FIG. 1 (optical device according to the first embodiment of the invention).
Figure 9:
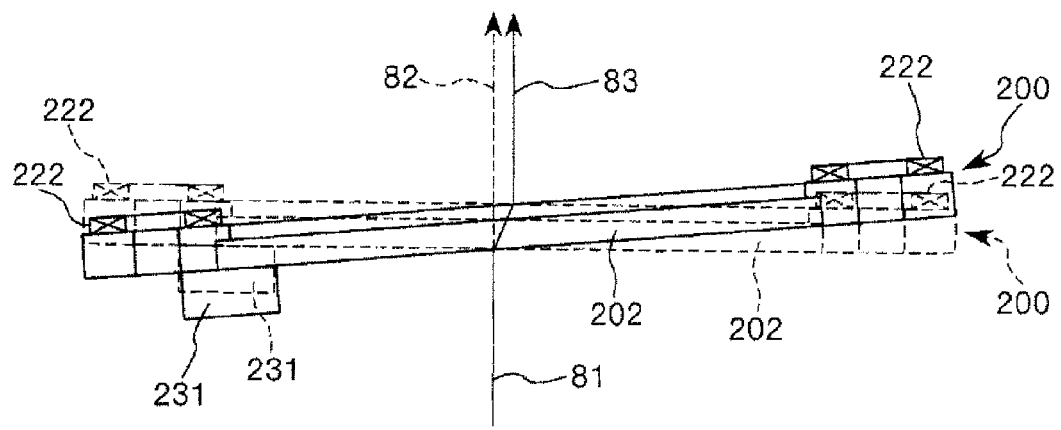
FIG. 9 describes a principle in accordance with which the optical path deflecting device shown in FIGS. 7A and 7B deflects light.
Figure 10:
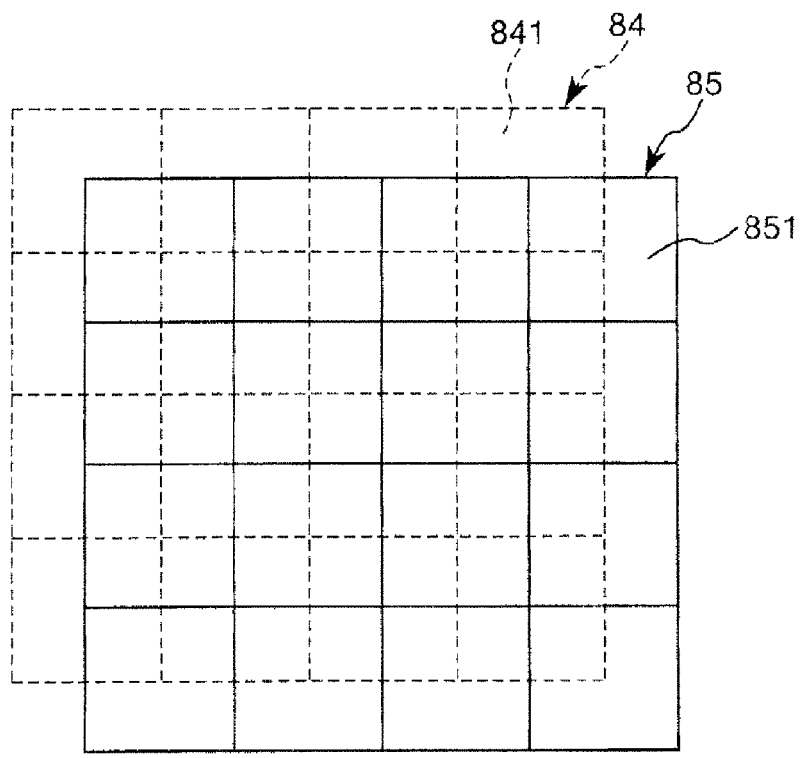
FIG. 10 describes the principle in accordance with which the optical path deflecting device shown in FIGS. 7A and 7B deflects light.

FIG. 1 shows the optical configuration of the projector using the image display apparatus according to the first embodiment of the invention. FIG. 2 is a block diagram showing the electrical configuration of the projector shown in FIG. 1. FIG. 3 is a perspective view showing the configuration of an optical path deflecting device shown in FIG. 1 (optical device according to the first embodiment of the invention). FIG. 4 is a plan view of the optical path deflecting device shown in FIG. 3. FIG. 5A is a cross-sectional view taken along the line A-A in FIG. 4. FIG. 5B is a cross-sectional view taken along the line B-B in FIG. 4. FIG. 6 is a cross-sectional view taken along the line C-C in FIG. 4. FIGS. 7A and 7B show how the optical path deflecting device shown in FIGS. 5A, 5B, and 6 operates. FIG. 8 is a cross-sectional view showing an example of another configuration of the optical path deflecting device shown in FIG. 1 (optical device according to the first embodiment of the invention). FIGS. 9 and 10 describe a principle in accordance with which the optical path deflecting device shown in FIGS. 7A and 7B deflects light. In the present specification, the description will be made under the definition of "upper" and "lower" corresponding to the upper side and the lower side in FIGS. 5A and 5B to FIG. 9, respectively, for ease of description.

A projector 1 shown in FIG. 1 is a projection-type projector that enlarges and projects an image displayed in a liquid crystal display device.

The projector 1 according to the present embodiment includes a light source 102, three mirrors 104a, 104b, and 104c, two dichroic mirrors 106a and 106b, three liquid crystal display devices 108R, 108G, and 108B, a dichroic prism 110, an optical path deflecting device 2, a projection lens system 112, and a relay lens 114, as shown in FIG. 1. The configuration of each of the components described above will be described below in detail.

The optical configuration of the projector 1 will first be described.

The light source 102 may, for example, be a halogen lamp, a mercury lamp, or a light emitting diode (LED). Further, a light source that emits white light is used as the light source 102.

Each of the three mirrors 104a, 104b, and 104c has a function of converting the optical path in the projector 1 through reflection.

On the other hand, the two dichroic mirrors 106a and 106b have a function of separating the white light emitted from the light source 102 into light fluxes of R (red), G (green), and B (blue), which are three primary colors, and guiding the separated light fluxes to the respective liquid crystal display devices 108R, 108G, and 108B.

For example, the dichroic mirror 106a, which receives the white light, has a function of transmitting light in an R wavelength band and reflecting light in G and B wavelength bands. On the other hand, the dichroic mirror 106b, which receives the light in the G and B wavelength bands that has been reflected off the dichroic mirror 106a, has a function of transmitting the light in the B wavelength band and reflecting the light in the G wavelength band.

After the reflection at the dichroic mirrors 106a and 106b and other types of optical operation, the length of the optical path of the light in the B wavelength band becomes longer than the length of the optical path of each of the other light fluxes. To handle the situation, the relay lens 114 is provided in a position along the optical path of the light in the B wavelength band to correct the difference in optical path length.

Each of the liquid crystal display devices 108R, 108G, and 108B is used as a spatial light modulator. The liquid crystal display devices 108R, 108G, and 108B are transmissive spatial light modulators corresponding to the primary colors R, G, and B and have pixels arranged in a matrix, for example, having 1080 vertically arranged rows and 1920 horizontally arranged columns. Each of the pixels adjusts the ratio of the amount of light passing through the pixel to the amount light incident on the pixel, and the liquid crystal display devices 108R, 108G, and 108B cooperatively control the light amount distribution over the entire pixels.

Each of the liquid crystal display devices 108R, 108G, and 108B is provided with scan lines and data lines (not shown) in correspondence with the pixels. Further, pixel electrodes are provided in correspondence with the positions where the scan lines and the data lines intersect each other, a common electrode is so disposed that it faces the pixel electrodes, and a liquid crystal material is disposed between the pixel electrodes and the common electrode (none of the components is shown).

In addition to the above components, each of the liquid crystal display devices 108R, 108G, and 108B is provided with a polarizer that is not shown. When a scan line is selected and a voltage on a data line is applied to the corresponding pixel electrode, the liquid crystal molecules are oriented accordingly and polarize light that passes through the liquid crystal molecules. The polarization caused by the liquid crystal molecules and the arrangement of the polarizer are so appropriately set that the amount of light that passes though each pixel can be adjusted.

The light fluxes spatially modulated by the liquid crystal display devices 108R, 108G, and 108B are incident on the dichroic prism 110 in three directions. Among the incident light fluxes, the light fluxes in the R and B wavelength bands are refracted by 90° and exit out of the dichroic prism 110. On the other hand, the light in the G wavelength band travels straight and exits out of the dichroic prism 110. As a result, the light having exited out of the dichroic prism 110 contains a full-color image that is a combination of images formed by the primary colors R, G, and B and enters the optical path deflecting device 2.

The optical path deflecting device 2, which will be described later in detail, includes an optical member and allows appropriate choice of whether or not light incident on the optical member is deflected (shifted).

The thus deflected light exits out of the optical path deflecting device 2 and enters the projection lens system 112.

The projection lens system 112 is a complex lens system that is a combination of a plurality of lenses. The combined image is enlarged and projected by the projection lens system 112 on a screen 8.

The electrical configuration of the projector 1 will next be described.

The projector 1 according to the present embodiment includes a control circuit 120 and an image signal processing circuit 122 as well as the optical path deflecting device 2 and the liquid crystal display devices 108R, 108G, and 108B described above.

The control circuit 120 controls write operation of data signals to the liquid crystal display devices 108R, 108G, and 108B, optical path deflection operation in the optical path deflecting device 2, generation operation of the data signals in the image signal processing circuit 122, and other types of operation.

The image signal processing circuit 122 has a function of separating an image signal Vid supplied from an external apparatus that is not shown into signals corresponding to the three primary colors R (red), G (green), and B (blue) and converting the separated image signals into data signals Rv, Gv, and Bv suitable for operation of the liquid crystal display devices 108R, 108G, and 108B. The converted data signals Rv, Gv, and Bv are supplied to the liquid crystal display devices 108R, 108G, and 108B, respectively, which then operate based on the supplied data signals.

Optical Path Deflecting Device

The optical path deflecting device 2 includes an optical member 202, which deflects light, a frame 204, which surrounds the side surfaces of the optical member 202, a frame-shaped support 208, which is separate from the frame 204 via an air gap 206 and surrounds the side surfaces of the frame 204, and shafts 210, which are so provided that the shafts 210 connect the frame 204 and the support 208 to each other, as shown in FIG. 3. Among the components described above, the optical member 202 is so configured that the attitude thereof changes when the optical member 202 is caused to swing around the shafts 210 as a swing axis. The optical member 202 can change, when the attitude thereof changes, the direction in which the light having passed through the optical member 202 exits (change position of optical path). The composite full-color image from the dichroic prism 110 can thus be deflected (shifted) in an arbitrary direction.

In the following description, the optical member 202, the frame 204, the support 208, and the shafts 210 described above are collectively referred to as a functional unit 200.

The optical path deflecting device 2 further includes a pair of drivers 220, which drive the optical member 202 in such a way that it swings, as shown in FIG. 3. The drivers 220 produce drive force that causes the optical member 202 to swing.

Further, the optical path deflecting device 2 includes a base 240, which is provided below the functional unit 200, and a spacer 250, which is provided between the functional unit 200 and the base 240, as shown in FIGS. 5A and 5B.

The optical path deflecting device 2 still further includes a first restricting member 231, which is provided at least on the plate surface of the optical member 202, and a second restricting member 232, which is disposed in a position separate from the first restricting member 231, as shown in FIG. 6. The first restricting member 231 is so configured that it comes into contact with the second restricting member 232 when the optical member 202 and the frame 204 swing. The configuration in which the thus configured first restricting member 231 and second restricting member 232 are allowed to come into contact with each other can suppress unnecessary vibration of the optical member 202 produced due to the swing motion. As a result, occurrence of the unnecessary vibration is avoided or the amount of the unnecessary vibration is reduced, whereby the light having passed through the optical member 202 can exit in a consistent direction. A decrease in the quality of an image projected on the screen 8 can therefore be suppressed.

The configuration of each of the components of the optical path deflecting device 2 will be described below in detail.

Functional Unit

The components of the functional unit 200 will first be described.

The optical member 202 according to the present embodiment is formed of a light-transmissive, plate-shaped part. Light incident on the optical member 202, depending on the angle of incidence, travels straight and passes through the optical member 202 or is refracted and passes through the optical member 202 (spatially modulated). The direction in which the light having passed through the optical member is deflected and the amount of deflection can therefore be controlled by changing the attitude of the optical member 202 in such a way that a target angle of incidence is achieved.

The optical member 202 may be made, for example, of quartz, sapphire, or any of other variety of crystalline materials, borosilicate glass, quartz glass, or any of other variety of glass materials, or a polycarbonate-based resin, an acrylic resin, or any of other variety of resin materials. Among the materials described above, an inorganic material is preferably used. The optical member 202, when it is made of an inorganic material, shows low elasticity, in other words, large rigidity, whereby unevenness in deflection of an image deflected by the optical member 202 is suppressed.

Further, the optical member 202 according to the present embodiment has a rectangular (oblong) shape, as shown in FIG. 4. The optical member 202 is sized as appropriate in a plan view in such a way that light rays having exited out of the dichroic prism 110 are allowed to pass through the optical member 202. In FIG. 4, the direction parallel to the major axis of the optical member 202 is called an X-axis direction, and the direction parallel to the minor axis thereof is called a Y-axis direction.

The frame 204 is so provided that it surrounds the side surfaces of the optical member 202. The frame 204 is made of an elastic material more elastic than the material of which the optical member 202 is made. The frame 204, which is made of a more elastic material, can minimize conversion of stress produced in the frame 204 due to the swing motion into unnecessary vibration of the optical member 202 itself. That is, the elastic frame 204, which surrounds the side surfaces of the optical member 202, can suppress the stress induced in the optical member 202 when the attitude of the optical member 202 is changed and can hence suppress unnecessary vibration of the optical member 202 produced in accordance with the distribution of the stress. As a result, a situation in which an image is deflected by the optical member 202 in an unintended direction will be avoided.

Further, the frame-shaped support 208 is so provided in a portion outside the frame 204 that the support 208 surrounds the side surfaces of the frame 204 via the air gap 206. The two shafts 210 connect the frame 204 and the support 208 to each other.

The support 208 is fixed to the spacer 250, and the frame 204 is supported by the support 208 only via the two shafts 210. The frame 204 and the optical member 202 can therefore swing around a straight line passing through the shafts 210 and serving as the swing axis.

The frame 204, the support 208, and the shafts 210 may be parts separate from each other and bonded to each other or may preferably be formed as an integral part. In the latter case, the portion where the frame 204 and the shafts 210 are connected to each other and the portion where the support 208 and the shafts 210 are connected to each other have high impact resistance and long-term durability.

The shafts 210 are made of the same elastic material of which the frame 204 described above is made.

Further, the support 208 is not necessarily made of a specific material and may be made of a material other than a resin material but is preferably made of a resin material. When the support 208 is formed integrally with the frame 204 and the shafts 210, the support 208 is made of the same elastic material of which the frame 204 described above is made.

The elastic material is not limited to a specific one and may be any material more elastic than the material of which the optical member 202 is made, and a material primarily containing a resin is preferably used. A material containing a resin can be sufficiently more elastic than the material of which the optical member 202 is made and therefore makes the advantageous effect described above provided by the frame 204 more marked.

Examples of the resin may include polyethylene, polypropylene, silicone, polyacetal, polyamide, polycarbonate, polyphenylene ether, polyethylene terephthalate, polybutylene terephthalate, polyarylate, polysulphone, polyethersulphone, polyphenylene sulfide, polyether ether ketone, polyimide, polyetherimide, and fluororesin, and a resin containing at least one of the materials described above is used.

The degree of elasticity of a material can be defined, for example, in the form of the degree of tensile elasticity, tensile yield stress, or tensile strength. That is, the elastic material described above may be a material having tensile elasticity smaller than that of the material of which the optical member 202 is made or a material having tensile yield stress or tensile strength greater than that of the material of which the optical member 202 is made.

Specifically, the tensile elasticity of the elastic material described above is preferably greater than or equal to about 0.1% but smaller than or equal to about 10% of the tensile elasticity of the material of which the optical member 202 is made, more preferably greater than or equal to about 0.5% but smaller than or equal to about 3% thereof. Setting the ratio of the tensile elasticity of the elastic material to the tensile elasticity of the material of which the optical member 202 is made to fall within the ranges described above suppresses deformation of the optical member 202 and allows the optical member 202 to swing around the shafts 210 over a sufficient range. That is, unevenness in deflection of an image deflected by the optical member 202 can be suppressed, and the ranges of the deflection direction and the amount of deflection can be widened. Further, since degradation of the elastic material can be sufficiently suppressed over the deflection operation, a situation in which mechanical characteristics of the shafts 210 and the frame 204 change due to the swing motion can be avoided, and long-term reliability of optical characteristics of the optical path deflecting device 2 can be ensured.

Further, the tensile yield stress of the elastic material described above is preferably greater than or equal to about 101% but smaller than or equal to about 500% of the tensile strength of the material of which the optical member 202 is made, more preferably greater than or equal to about 105% but smaller than or equal to about 400% thereof. Setting the ratio of the tensile yield stress of the elastic material to the tensile strength of the material of which the optical member 202 is made to fall within the ranges described above sufficiently widens the range over which the elastic material is elastically deformed, whereby the optical member 202 is allowed to swing around the shafts 210 over a sufficient range. As a result, even when the range of the swing motion is large, degradation of the elastic material due to stress concentration can be sufficiently suppressed.

The two shafts 210 according to the present embodiment are provided in different positions of the two major-axis sides of the optical member 202. Each of the two shafts 210 is so configured that the axis line thereof is inclined to both the X and Y axes shown in FIG. 4. That is, the swing axis around which the frame 204 and the optical member 202 swing is inclined to both the X and Y axes shown in FIG. 4.

A group of pixels that form an image deflected by the optical member 202 is typically a set of pixels arranged in rows in parallel to the X axis with the rows arranged along the Y axis. That is, the group of pixels are arranged in a matrix in an XY plane. The number of pixels is not limited to a specific value and is, for example, 1920 columns in the X-axis direction and 1080 rows in the Y-axis direction.

An image (group of pixels) formed of the pixels arranged in a matrix is deflected when the image passes through the optical member 202. In this process, since the axis around which the optical member 202 swings is inclined to both the X and Y axes as described above, the direction in which the image is deflected is also inclined to both the X and Y axes. Therefore, when an image projected on the screen 8, for example, has a rectangular shape, the image can be shifted in directions inclined to both the vertical and horizontal directions. As a result, the vertical and horizontal resolution of the image can be effectively increased, whereby the resolution of the projected image can be increased.

The two shafts 210 are so disposed that the axis lines thereof are aligned with the same straight line. The straight line is the axis around which the optical member 202 swings.

The two shafts 210 are preferably disposed in positions that satisfy a point symmetry relationship with respect to the center of the optical member 202 in a plan view. In this case, the swing motion is balanced well, and the optical member 202 is therefore allowed to stably swing, whereby the image is stably deflected. As a result, a high-resolution image can be projected in a stable manner.

The frame 204 according to the present embodiment is so configured that it entirely surrounds the side surfaces of the optical member 202, but the frame 204 does not necessarily surround the entire side surfaces. For example, part of the frame 204 may be a void.

The support 208 according to the present embodiment has a frame-like shape but does not necessarily have a frame-like shape and may have any shape that can hold the shafts 210.

The optical member 202 and the frame 204 may be bonded to each other in any manner and are bonded to each other, for example, with an adhesive. Examples of the adhesive may include an epoxy-based adhesive, an acryl-based adhesive, and a silicone-based adhesive.

Drivers

The drivers 220 will next be described.

Each of the drivers 220 according to the present embodiment includes a through hole 221, which passes through the frame 204 in the thickness direction, a ring-shaped coil 222, which is so placed on the frame 204 that the coil 222 surrounds the through hole 221, a core 223, which is placed on the upper surface of the base 240 and inserted into the through hole 221, and a magnet 224, which is provided in a position adjacent to the core 223.

The through hole 221 is a hole having an elongated opening formed in a position corresponding to the minor-axis side of the frame 204, and the through hole 221 is so formed that the major axis thereof is parallel to the minor-axis side of the frame 204. The opening of the through hole 221 has a rectangular (oblong) shape in FIG. 4 but does not necessarily have a specific shape. It is, however, noted that the core 223 is inserted into the through hole 221 and the outer surface of the core 223 does not preferably come into contact with the inner surface of the through hole 221 in the insertion process. It is therefore desirable that a gap is always present between the through hole 221 and the core 223 when the optical member 202 swings.

The coil 222 is bonded to the upper surface of the frame 204. The coil 222 has a ring shape and is so configured in the present embodiment that the inner side of the ring roughly coincides with the opening of the through hole 221.

The coil 222 is connected to a voltage applicator that is not shown. When the voltage applicator applies a voltage to the coil 222, a magnetic field is produced in a portion in the vicinity of the coil 222. On the other hand, the magnet 224 is disposed in a position adjacent to the core 223.

The core 223 is a partially-bent, plate-shaped magnetic core. The thus shaped core 223 has two legs 2231 and 2232, which stand on the upper surface of the base 240, and a beam 2233, which connects ends of the two legs 2231 and 2232 to each other, as shown in FIG. 6. The leg 2231 is so disposed that it is inserted into the through hole 221. On the other hand, the leg 2232 is disposed in a position outside the frame-shaped support 208. The magnet 224 is disposed in a position adjacent to the leg 2232. That is, the core 223 is so provided that it extends over the minor-axis side of the frame-shaped support 208.

The thus shaped core 223 is made, for example, of pure iron, soft ferrite, permalloy, or any other soft magnetism material.

When a voltage is applied to the coil 222, magnetic force that drives the coil 222 is produced, and the direction of the magnetic force is upward or downward in FIG. 6 depending on the voltage application direction and the direction of the magnetic field produced by the magnet 224. The magnetic force can drive the frame 204 and the optical member 202 upward or downward.

The magnet 224 is formed, for example, of a permanent magnet. The magnet 224, which is disposed in a position adjacent to the leg 2232, produces a magnetic field in the vicinity of the core 223, and drive force acting on the coil 222 is produced based on the magnetic field.

The permanent magnet is, for example, a neodymium magnet, a ferrite magnet, a samarium cobalt magnet, or an alnico magnet.

Each of the drivers 220 using the magnetic force described above is an example of a driver according to an embodiment of the invention and can be replaced with a different method by which the frame 204 and the optical member 202 are driven. An example of the different method may be piezoelectric drive.

Further, the positions of the drivers 220 and the number of drivers 220 are not limited to those shown in the drawings.

Base

The base 240 will next be described.

The base 240, which has a plate-like shape, supports the functional unit 200 and ensures mechanical strength of the optical path deflecting device 2.

The base 240 according to the present embodiment has a rectangular shape slightly larger than the functional unit 200 in a plan view, and the base 240 is so configured that the periphery thereof extends off the outer edge of the functional unit 200. The leg 2232 of each of the cores 223 described above is provided at the portion that extends off the functional unit 200.

The base 240 is made, for example, of glass, silicon, a metal material, a ceramic material, or any other inorganic material or a resin or any other organic material.

Further, the base 240 has a through hole 241 formed therethrough in the thickness direction in correspondence with the position of the optical member 202. The thus provided through hole 241 allows an image to pass through the optical path deflecting device 2.

The base 240 does not necessarily have the shape shown in the drawings and may have any shape that can support the functional unit 200.

Spacer

The spacer 250 will next be described.

The spacer 250 is inserted between the functional unit 200 and the base 240. The thus placed spacer 250 has a frame-like shape, and a space 251 is defined by the inner wall of the spacer 250, the upper surface of the base 240, and the lower surface of the functional unit 200. The space 251 is a space that allows the frame 204 and the optical member 202 to swing.

In the present embodiment, the spacer 250 has the same shape and the same dimension as those of the functional unit 200. The spacer 250 does not necessarily have a specific shape and may have any shape that can form a space that allows the frame 204 and other components to swing. For example, the spacer 250 does not necessarily have a frame-like shape, and the shape and dimension of the spacer 250 are not necessarily the same as those of the functional unit 200.

The spacer 250 is made, for example, of glass, silicon, a metal material, a ceramic material, or any other inorganic material or a resin or any other organic material.

Restricting Members

The first restricting member 231 and the second restricting member 232 will next be described.

The first restricting member 231 is provided on the lower surface of the optical member 202, as shown in FIG. 6. The first restricting member 231 protrudes from the lower surfaces of the optical member 202 and the frame 204.

The optical path deflecting device 2 includes two first restricting members 231. One of the first restricting members 231 is disposed at one of the four corners of the optical member 202, which has a rectangular shape, specifically, at a corner most remote from the straight line passing through the two shafts 210, as shown in FIG. 4. The other first restricting member 231 is disposed at the corner opposite to the corner where the one first restricting member 231 is disposed, that is, at the corner on the opposite side of the straight line passing through the two shafts 210. In still other words, the two first restricting members 231 are disposed in positions equally separate from the straight line. The arrangement allows the optical member 202 to swing in a more stable manner.

The second restricting member 232 is formed of part of the upper surface of the base 240. The optical path deflecting device 2 shown in FIG. 6 is in a state in which the optical member 202 and other components are not swinging. In this state, the second restricting member 232 is positioned directly below the first restricting members 231.

Since the first restricting members 231 protrude from the lower surfaces of the optical member 202 and other components as described above, one of the first restricting members 231 comes into contact with the second restricting member 232 before the optical member 202 and other components do when the optical member 202 and other components swing. Unnecessary vibration of the optical member 202 produced due to the swing motion can thus be suppressed. Further, the first restricting member 231 is restricted not to swing to an angle greater than the swing angle at the time of the contact. As a result, a situation in which the optical member 202 undesirably comes into contact with the base 240 and behaves in an instable manner can be avoided, and degradation in characteristics of the elastic material and other disadvantageous effects resulting from an excessively large swing angle can be avoided.

In the present embodiment, when the optical path deflecting device 2 is viewed in a plan view in the direction perpendicular to the plate surface (upper surface) thereof, the first restricting members 231 are provided at the boundary between the optical member 202 and the frame 204. That is, the first restricting members 231 are provided in positions where they overlap with both the optical member 202 and the frame 204. The thus disposed first restricting members 231 can more reliably suppress produced unnecessary vibration of the optical member 202.

Since the optical member 202 and the frame 204 are parts separate from each other, in a case where the first restricting members 231 are provided only on the optical member 202, no force that suppresses direct vibration acts on the frame 204 when one of the first restricting members 231 comes into contact with the second restricting member 232, and the vibration may not be sufficiently suppressed. In the present embodiment, in which the first restricting members 231 are so provided that they overlap with both the optical member 202 and the frame 204, force that suppresses direct vibration is allowed to act not only on the optical member 202 but also on the frame 204, whereby produced unnecessary vibration of the optical member 202 can be more reliably suppressed.

Further, since the first restricting members 231 are so provided that they overlap with both the optical member 202 and the frame 204, impact produced when one of the first restricting members 231 comes into contact with the second restricting member 232 will not lead to breakage of the portion where the optical member 202 and the frame 204 are connected to each other (separation therebetween).

In the embodiment of the invention, since simply providing the first restricting members 231 and the second restricting member 232 achieves the advantageous effect described above, the embodiment of the invention is useful also because the optical path deflecting device 2 having a stable deflection characteristic can be simply configured.

Further, it is believed that the advantageous effect results from the configuration in which an elastic material more elastic than the optical member 202 is used as the material of which the frame 204 is made as described above. It is then believed that using the elastic material as the material of which the frame 204 is made allows unnecessary vibration of the optical member 202 to be absorbed but does not allow impact produced when one of the first restricting members 231 comes into contact with the second restricting member 232 to readily propagate to the optical member 202. As a result, it is also expected that induction of unintended vibration of the optical member 202 in response to the impact is advantageously suppressed.

The first restricting members 231, which overlap with both the optical member 202 and the frame 204 in a plan view, do not necessarily overlap with them in a specific manner. For example, the first restricting members 231 may be shifted toward the optical member 202 or may conversely be shifted toward the frame 204.

Specifically, the ratio of the area where the first restricting members 231 overlap with the optical member 202 to the area where the first restricting members 231 overlap with the frame 204 is preferably greater than or equal to about 1:9 but smaller than or equal to about 9:1, more preferably greater than or equal to about 2:8 but smaller than or equal to about 8:2. Setting the ratio within the ranges described above makes the advantageous effect described above more marked.

The thus configured first restricting members 231 are made, for example, of glass, silicon, a metal material, a ceramic material, or any other inorganic material or a resin or any other organic material.

The first restricting members 231 may be made of a material less elastic than the elastic material described above. In this case, unnecessary vibration of the optical member 202 is likely to propagate toward the second restricting member 232, and conversion of the impact produced when one of the first restricting members 231 comes into contact with the second restricting member 232 into unnecessary vibration of the optical member 202 is more likely to be suppressed. As a result, unnecessary vibration of the optical member 202 can be particularly suppressed.

The first restricting members 231 only need to be made of a material having tensile elasticity greater than that of the elastic material described above or a material having tensile yield stress or tensile strength smaller than that of the material of which the optical member 202 is made.

Specifically, the tensile elasticity of the material of which the first restricting members 231 are made is preferably greater than or equal to about 101% but smaller than or equal to about 1000% of the tensile elasticity of the elastic material described above, more preferably greater than or equal to about 110% but smaller than or equal to about 800% thereof. Setting the ratio of the tensile elasticity of the material of which the first restricting members 231 are made to the tensile elasticity of the elastic material to fall within the ranges described above prevents impact produced when one of the first restricting members 231 comes into contact with the second restricting member 232 from being converted into vibration of the optical member 202 in a more effective manner.

Further, the tensile yield stress or tensile strength of the material of which the first restricting members 231 are made may be greater than or equal to about 1% but smaller than or equal to about 95% of the tensile yield stress of the elastic material described above or may be greater than or equal to about 10% but smaller than or equal to about 90% thereof.

FIG. 8 is a cross-sectional view showing an example of another configuration of the optical path deflecting device shown in FIG. 1 (optical device according to the first embodiment of the invention). The optical path deflecting device 2 shown in FIG. 8 is the same as the optical path deflecting device 2 shown in FIG. 3 to FIGS. 7A and 7B except that the first restricting members 231 are configured differently.

The first restricting members 231 shown in FIG. 8 are made of the same elastic material of which the frame 204 is made. The frame 204 and the first restricting members 231 are formed integrally with each other. The first restricting members 231 can thus also function as a holding member that holds the optical member 202. Further, the structure of the optical path deflecting device 2 can be simplified.

The first restricting members 231 are not necessarily made of a specific material and may be made of a material more elastic than the elastic material described above.

The configuration of the first restricting members 231 and the second restricting member 232 is not limited to the configuration described above. For example, the first restricting members 231 are not necessarily located in the positions shown in FIG. 4 and may be located in other positions. Further, the number of first restricting members 231 is not limited to two and may be one or three or greater.

Further, the second restricting member 232 may be a member separate from the base 240. In this case, the second restricting member 232 may be made of a material less elastic than the elastic material described above. The second restricting member 232 preferably has elasticity different from the elasticity of the first restricting members 231.

Each of the first restricting members 231 according to the present embodiment has a box-like shape but does not necessarily has a specific shape and may have, for example, a hemispherical shape, a circularly columnar shape, or a rectangularly columnar shape.

Further, part of each of the first restricting members 231 may be a void so that the portion where the first restricting member 231 overlaps with the optical member 202 affects image transmission by the smallest possible amount.

The operation of the optical path deflecting device 2 will next be described. The optical path deflecting device 2 only needs to operate in the same manner described, for example, in JP-A-2012-013766.

When no voltage is applied to the coils 222, the optical member 202 in the optical path deflecting device 2 does not swing as shown in FIGS. 5A, 5B, and 6. Light 81 is therefore incident on the optical member 202 at right angles, travels straight without refraction, and exits out of the optical member 202 in the form of light 82, as indicated by the broken line in FIG. 9.

On the other hand, when a predetermined voltage is applied to each of the coils 222, the optical member 202 is so inclined that one of the drivers 220 approaches the base 240 and the other driver 220 moves away from the base 240 as shown in FIGS. 7A and 7B. In other words, the application direction of the voltage applied to each of the coils 222 is so set that the drivers 220 behave as described above. As a result, the optical member 202 is inclined as indicated by the solid lines in FIG. 9, and the light 81 incident on the optical member 202 in this state is refracted when it passes through the optical member 202 and exits out thereof in the form of light 83. Since the light 83 is spatially shifted from the light 82, an image formed by the light 83 is projected on the screen 8 in a position shifted from an image formed by the light 82.

The optical path deflecting device 2 includes the two drivers 220, which are disposed in correspondence with the minor-axis sides of the frame 204, as described above. Therefore, when the two drivers 220 perform drive operation in different directions, the frame 204 and the optical member 202 can smoothly swing. That is, in a time frame, one of the drivers 220 may drive the frame 204 upward and the other driver 220 may drive the frame 204 downward, whereas in another time frame, the one driver 220 may drive the frame 204 downward and the other driver 220 may drive the frame 204 upward. In still another time frame, no voltage may be applied to the coils 222 so that the frame 204 or the optical member 202 does not swing. The behavior of the optical path deflecting device 2 can be controlled as intended by controlling the application of voltages to the coils 222 to achieve any of the time frames described above as appropriate.

FIG. 10 shows an image 84 and an image 85, in each of which pixels are arranged in a matrix formed of four vertically arranged rows and four horizontally arranged columns. The image 84 is a set of pixels 841 formed by the light 82 shown in FIG. 9, and the image 85 is a set of pixels 851 formed by the light 83 shown in FIG. 9.

FIG. 10 shows a case where the image 84 is shifted to the image 85 by causing the optical member 202 to swing. The amount of shift in this case is one-half the intervals between the pixels 841. As a result, the number of pixels in the image 85 projected on the screen 8 is twice the number of pixels in the image 84, whereby the resolution of a projected image can be increased.

Further, the image 85 is shifted in a direction inclined to the direction in which the pixels 841 are arranged, as described above. The number of pixels in the image 85 is therefore effectively doubled in both the vertical and horizontal directions.

In the state shown in FIGS. 7A and 7B, one of the first restricting members 231 is in contact with the second restricting member 232. The positional relationship between the first and second restricting members is likely to be uniquely determined. As a result, the swing angle of the optical member 202 is likely to be uniquely determined. As a result, the amount of shift of the image 85 is likely to be uniquely determined, whereby a decrease in the degree of high definition of the image 85 having undergone the resolution increasing operation can be suppressed. Therefore, the thickness and position of each of the first restricting members 231 only needs to be so adjusted as appropriate that one of the first restricting members 231 comes into contact with the second restricting member 232 when the optical member 202 is so inclined that the image 85 is formed.

Since the configuration in which one of the first restricting members 231 comes into contact with the second restricting member 232 suppresses produced unnecessary vibration of the optical member 202, disturbance of the image 85 due to the unnecessary vibration and a decrease in the degree of high definition of the image 85 can be suppressed.

The amount of shift of an image shifted by the optical path deflecting device 2 is not limited to one-half the intervals between the pixels and may, for example, be one-fourth or one-eighth thereof.

Second Embodiment

An optical path deflecting device using an optical device according to a second embodiment of the invention will next be described.

Figure 11:
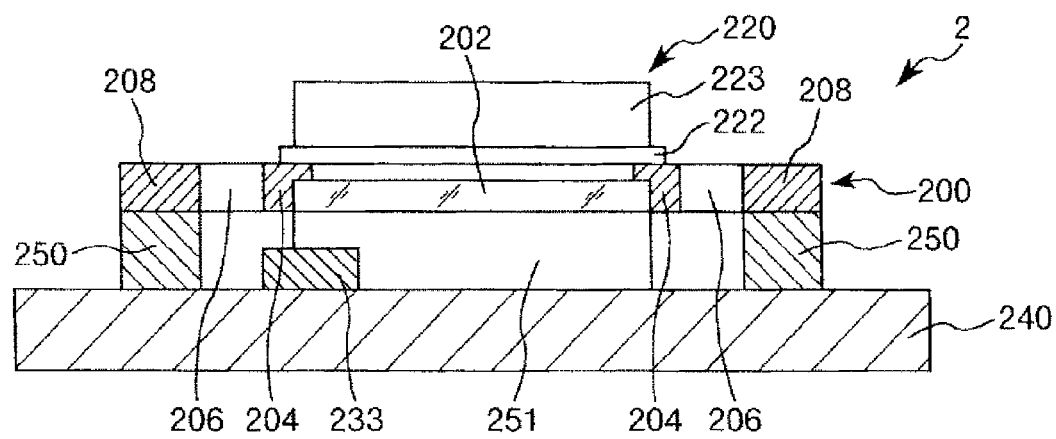
FIG. 11 is a cross-sectional view showing the configuration of an optical path deflecting device using an optical device according to a second embodiment of the invention.

FIG. 11 is a cross-sectional view showing the configuration of the optical path deflecting device using the optical device according to the second embodiment of the invention. In FIG. 11, the same configurations as those in the embodiment described above have the same reference characters.

The second embodiment will be described below. The following description will be made primarily on items different from those in the first embodiment, and items that are the same as those in the first embodiment will not be described.

The second embodiment is the same as the first embodiment except that the restricting members are configured differently.

The optical path deflecting device 2 shown in FIG. 11 includes a restricting member 233. The restricting member 233 is so configured that it comes into contact with the optical member 202 when the optical member 202 and the frame 204 swing. The configuration in which the restricting member 233 comes into contact with the optical member 202 can suppress unnecessary vibration of the optical member 202 produced due to the swing motion. As a result, occurrence of unnecessary vibration is avoided or the unnecessary vibration is attenuated, and the light having passed through the optical member 202 can therefore be outputted in a consistent direction, whereby a decrease in the quality of an image projected on the screen 8 can be suppressed.

The restricting member 233 may be made of a material less elastic than the elastic material described above of which the frame 204 is made, a material more elastic than the elastic material, or a material equally elastic to the elastic material, as in the case of the first restricting members 231 according to the first embodiment.

Instead, the restricting member 233 may be so configured that it comes into contact with the frame 204 or may even be so configured that it comes into contact with both the optical member 202 and the frame 204. In the latter case, since impact produced at the time of the contact is unlikely to directly propagate to the optical member 202, whereby produced unnecessary vibration of the optical member 202 can be more reliably suppressed. The reason for this is conceivably that the optical member 202 and the frame 204 are parts separate from each other and have different degrees of elasticity.

Third Embodiment

An optical path deflecting device using an optical device according to a third embodiment of the invention will next be described.

Figure 12:
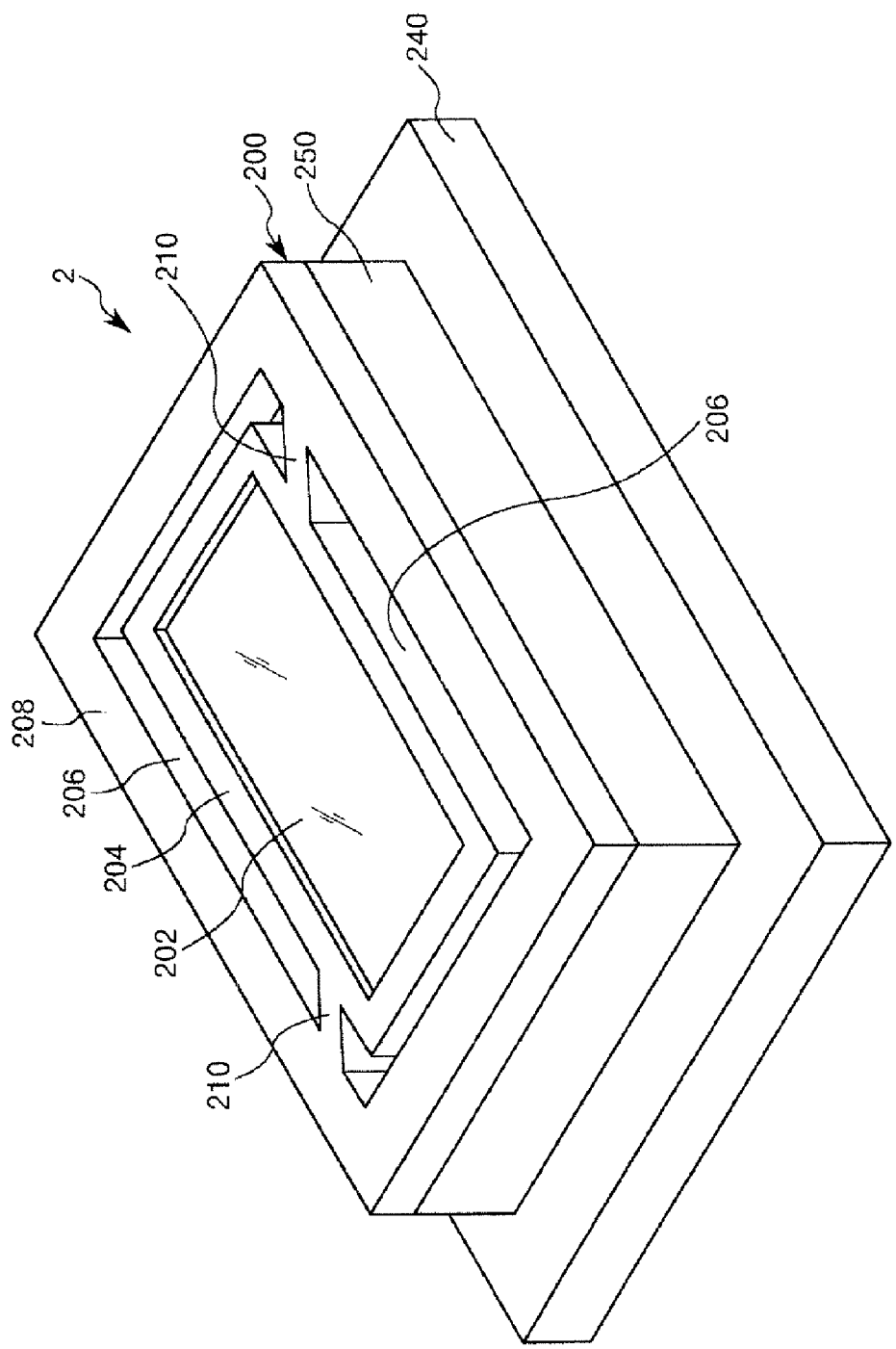
FIG. 12 is a perspective view showing the configuration of an optical path deflecting device using an optical device according to a third embodiment of the invention.
Figure 13:
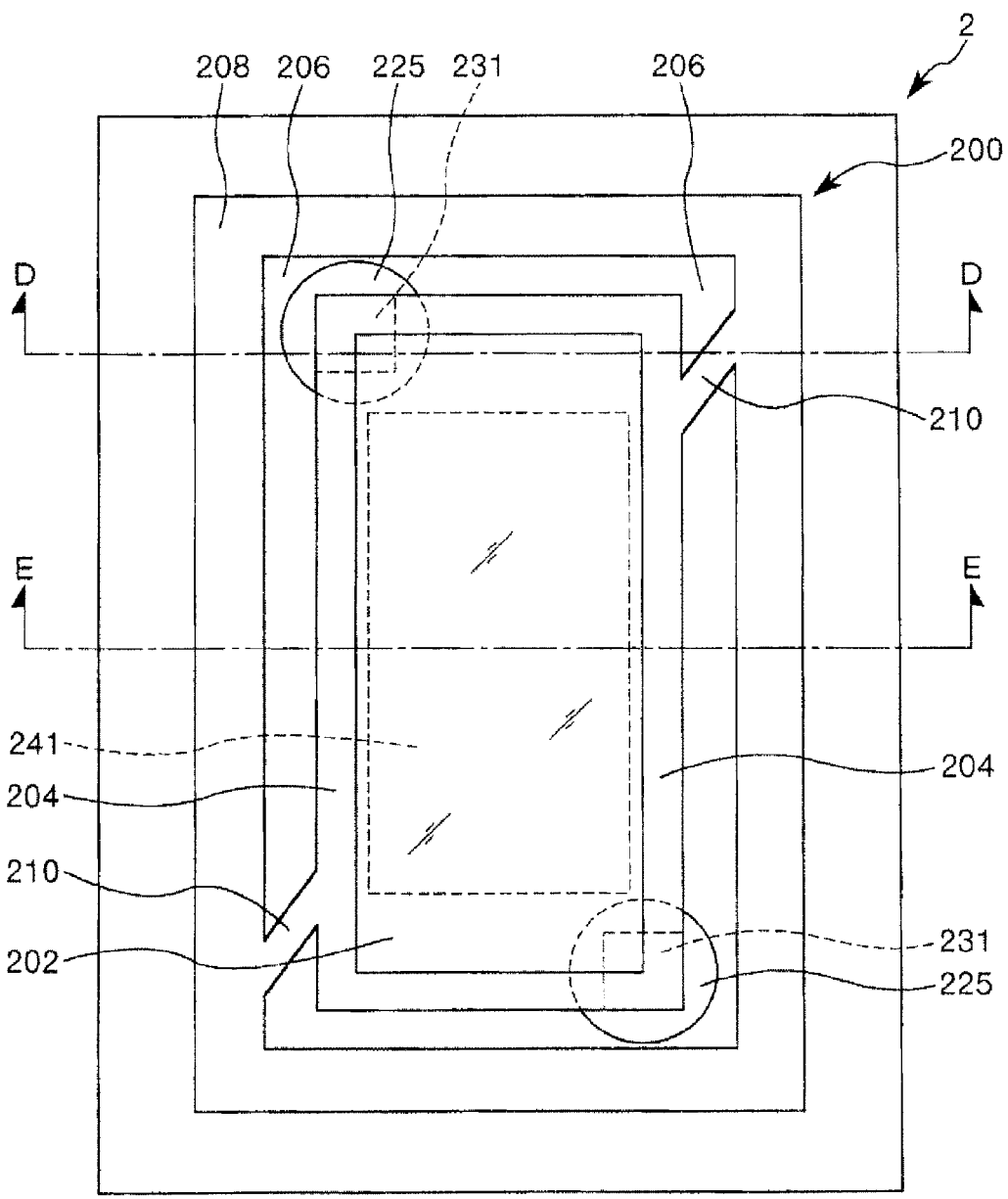
FIG. 13 is a plan view of the optical path deflecting device shown in FIG. 12.
Figure 14A:
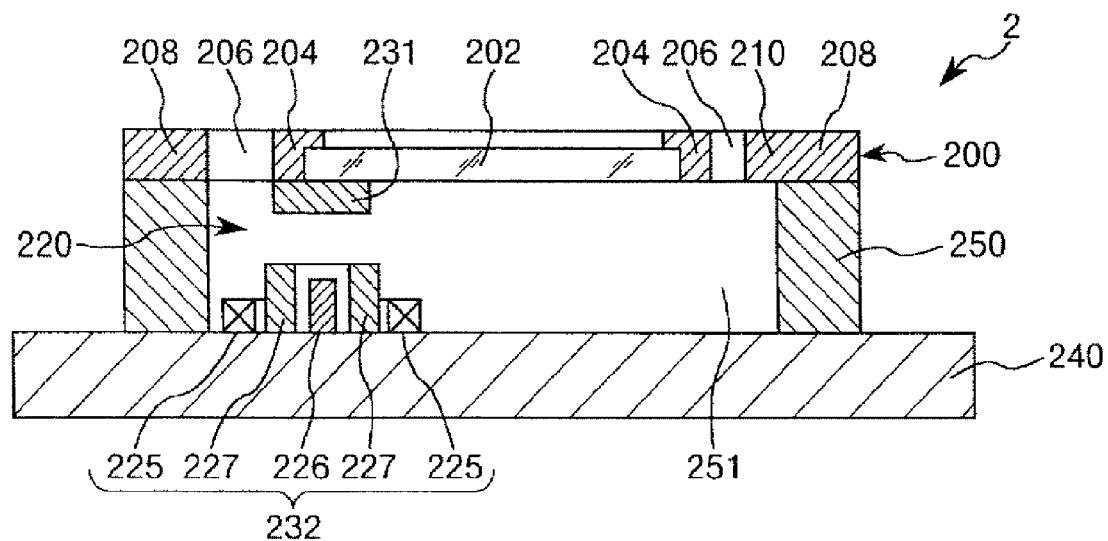
FIG. 14A is a cross-sectional view taken along the line D-D in FIG. 13.
Figure 14B:
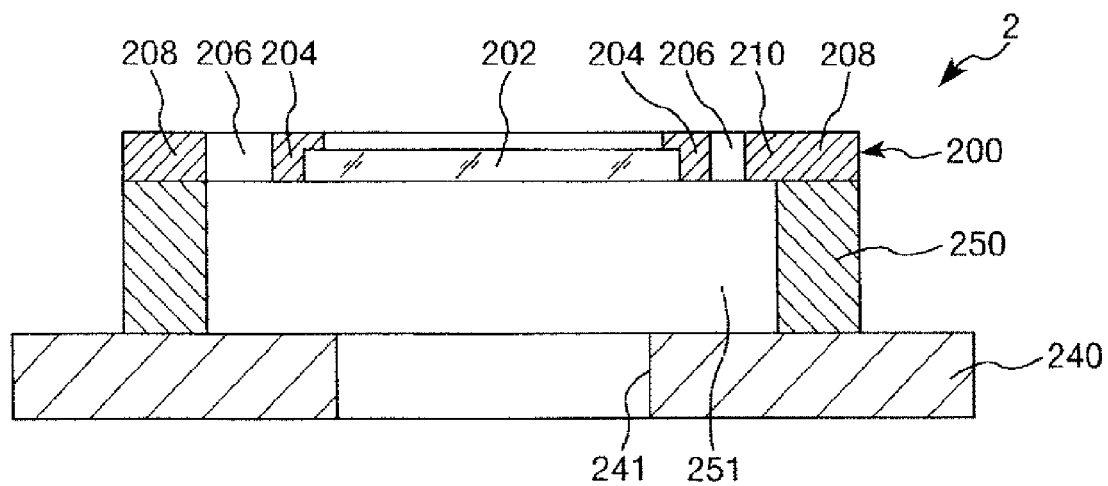
FIG. 14B is a cross-sectional view taken along the line E-E in FIG. 13.
Figure 15:
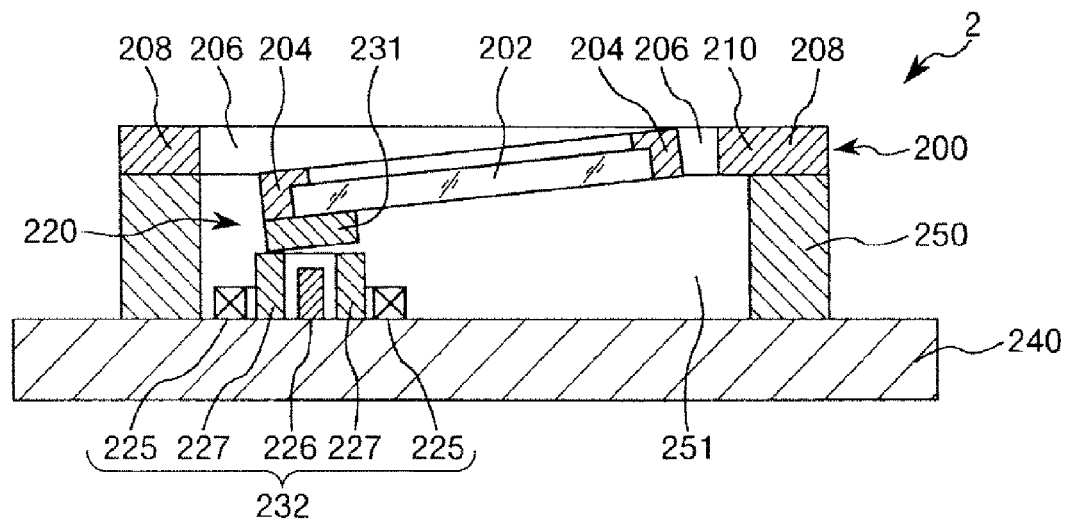
FIG. 15 shows how the optical path deflecting device shown in FIGS. 14A and 14B operates.

FIG. 12 is a perspective view showing the configuration of the optical path deflecting device using the optical device according to the third embodiment of the invention. FIG. 13 is a plan view of the optical path deflecting device shown in FIG. 12. FIG. 14A is a cross-sectional view taken along the line D-D in FIG. 13. FIG. 14B is a cross-sectional view taken along the line E-E in FIG. 13. FIG. 15 shows how the optical path deflecting device shown in FIGS. 14A and 14B operates. In FIGS. 12 to 15, the same configurations as those in the embodiments described above have the same reference characters.

The optical path deflecting device 2 according to the present embodiment is the same as the optical path deflecting device 2 according to the first embodiment described above except that the drivers 220, the first restricting members 231, and the second restricting member 232 are configured differently.

In the present embodiment, first restricting members 231 and second restricting members 232 have the same function as that in the first embodiment, that is, the function of suppressing unnecessary vibration of the optical member 202.

In addition, the first restricting members 231 and the second restricting members 232 according to the present embodiment also have the function of the drivers 220. The number of parts of the optical path deflecting device 2 can therefore be reduced, whereby the structure of the optical path deflecting device 2 can be simplified. As a result, the optical path deflecting device 2 can be more readily manufactured at a reduced cost.

Further, each of the first restricting members 231 according to the present embodiment is formed of a permanent magnet. The first restricting members 231 may be made of a material less elastic than the elastic material described above, as in the first embodiment.

On the other hand, each of the second restricting members 232 is a member separate from the base 240, unlike the first embodiment.

Each of the second restricting members 232 includes a ring-shaped coil 225, which is provided on the upper surface of the base 240, a core 226, which is provided in a position inside the coil 225, and a spacer 227, which is provided between the coil 225 and the core 226.

The coil 225 is connected to a voltage applicator that is not shown. When the voltage applicator applies a voltage to the coil 225, a magnetic field is produced in a portion in the vicinity of the coil 225. The coil 225 therefore functions as an electromagnet. The core 226 has a circularly columnar shape, and the axis line thereof is parallel to the axis line of the second restricting member 232.

Further, the spacer 227 is disposed on the upper surface of the base 240 and has a cylindrical shape having an axis line perpendicular to the upper surface.

When a voltage is applied to the coil 225, magnetic force acts on the first restricting member 231 and drives the first restricting member 231 upward or downward in FIGS. 14A and 14B depending on the voltage application direction and the direction of the magnetic field produced by the permanent magnet that forms the first restricting member 231. That is, magnetic interaction occurs between the permanent magnet that forms the first restricting members 231 and the electromagnet that the second restricting member 232 forms. The magnetic interaction can drive portions of the frame 204 and the optical member 202 where the first restricting member 231 is provided upward or downward (induce swing motion).

The application of a voltage to each of the coils 225 or the arrangement of the permanent magnet that forms each of the first restricting members 231 is so set as appropriate that the two first restricting members 231 receive different types of magnetic force that drive them in directions different from each other.

Further, the spacer 227 according to the present embodiment is made of a non-magnetic material. The lines of the magnetic force produced by the coil 225 can pass through the spacer 227 and magnetize the core 226. In addition, since the spacer 227 is hardly magnetized, magnetic interaction hardly occurs between the spacer 227 and the first restricting member 231. Therefore, when the magnetic field produced by the coil 225 exerts magnetic force on the permanent magnet that forms the first restricting member 231, a situation in which magnetism left in the spacer 227 prevents the first restricting member 231 from being driven is avoided. As a result, the optical member 202 can be driven as intended by applying a voltage to each of the coils 225.

The non-magnetic material described above may, for example, be glass, silicon, a ceramic material, or a resin material. The non-magnetic material is preferably a material less elastic than the elastic material described above. Unnecessary vibration of the optical member 202 produced when the optical member 202 swings can therefore be more reliably suppressed.

The length of the spacer 227 in the axis line direction is preferably longer than the length of the core 226 in the axis direction and greater than the thickness of the coil 225. In this configuration, when the optical member 202 swings, one of the first restricting members 231 comes into contact with the corresponding spacer 227 (second restricting member 232) but does not come into contact with the core 226 or the coil 225, as shown in FIG. 15. There is therefore not a problem that occurs when the permanent magnet that forms the first restricting member 231 comes into contact with the core 226 or the coil 225, for example, a problem of generation of strong magnetic attractive force between the permanent magnet and the core 226 and hence unintended drive operation of the optical member 202.

The third embodiment described above can provide the same effects and advantages as those provided by the first embodiment.

The configuration of the drivers 220 according to the present embodiment is not limited to the configuration described above. For example, each of the first restricting members 231 may include an electromagnet, and each of the second restricting members 232 may include a permanent magnet. Further, the first restricting members 231 and the second restricting members 232 both include electromagnets.

Fourth Embodiment

An optical path deflecting device using an optical device according to a fourth embodiment of the invention will next be described.

Figure 16:
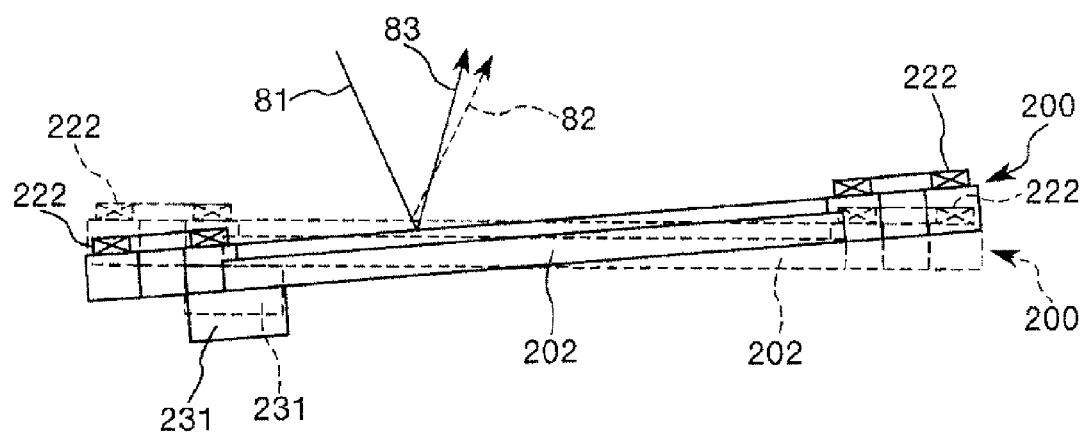
FIG. 16 describes a principle in accordance with which an optical path deflecting device using an optical device according to a fourth embodiment of the invention deflects light.

FIG. 16 describes a principle in accordance with which the optical path deflecting device using the optical device according to the fourth embodiment of the invention deflects light. In FIG. 16, the same configurations as those in the embodiments described above have the same reference characters.

The optical path deflecting device 2 according to the present embodiment is the same as the optical path deflecting devices 2 according to the first to third embodiments except that the optical member 202 deflects light in accordance with a different principle.

That is, an optical member 202 according to the present embodiment reflects light and differs in this point from the first to third embodiment, in which the optical member 202 transmits light.

When no voltage is applied to the coils 222, optical member 202 in the optical path deflecting device 2 does not swing, and light 81 incident on the optical member 202 is therefore reflected (undergoes spatial modulation) in the form of light 82 indicated by the broken line in FIG. 16.

On the other hand, when a predetermined voltage is applied to each of the coils 222, the optical member 202 is inclined as indicated by the solid lines in FIG. 16. In other words, the application direction of the voltage applied to each of the coils 222 is so set that the corresponding driver 220 behaves as shown in FIG. 16. When the optical member 202 is inclined, the angle of incidence of the light 81 incident on the optical member 202 also changes. The light 81 is therefore reflected in the form of light 83 indicated by the solid line. The deflection direction of the light 83 (reflected light) and the amount of deflection thereof can therefore be controlled by changing the attitude of the optical member 202 in such a way that a target angle of incidence is achieved. Since the light 83 is spatially shifted from the light 82, an image formed by the light 83 is projected on the screen 8 in a position shifted from an image formed by the light 82. As a result, a projector including the thus configured optical path deflecting device 2 provides the same advantageous effects as those provided by the projectors according to the first and second embodiments.

The optical member 202 according to the present embodiment is not necessarily made of a specific material and may be made of any material that reflects light. For example, the optical member 202 may be made of silicon, a metal, or any other shiny material or may be formed, for example, of a member produced by attaching a reflection film on any of the materials listed as the material of which the optical member 202 according to the first embodiment is made.

The fourth embodiment described above can provide the same effects and advantages as those provided by the first to third embodiments.

Fifth Embodiment

An optical scanner using an optical device according to a fifth embodiment of the invention and a projector using an image display apparatus according to the fifth embodiment of the invention will next be described.

Figure 17:
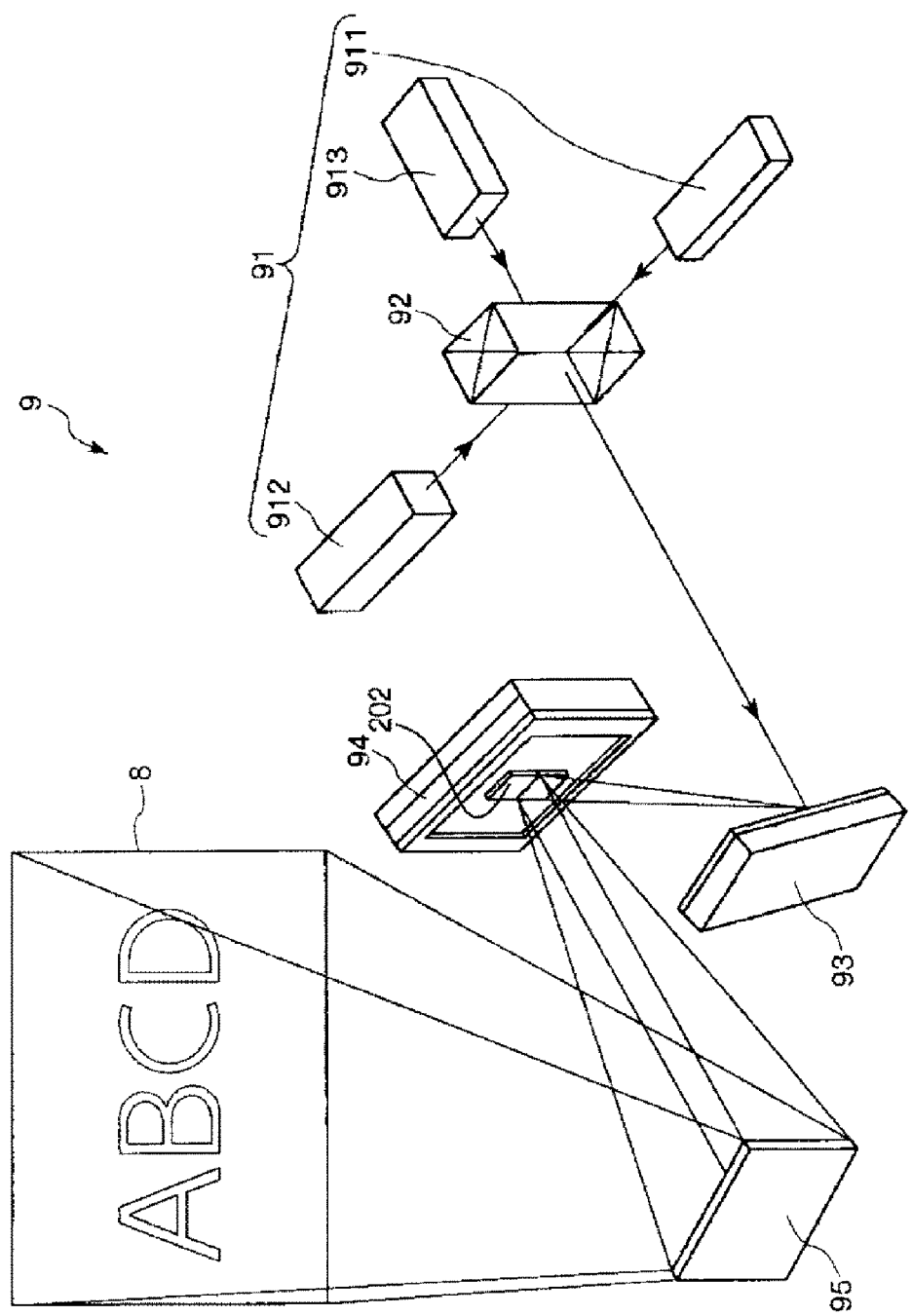
FIG. 17 shows the optical configuration of a projector using an image display apparatus according to a fifth embodiment of the invention.

FIG. 17 shows the optical configuration of the projector using the image display apparatus according to the fifth embodiment of the invention. In FIG. 17, the same configurations as those in the embodiments described above have the same reference characters.

A projector 9 according to the present embodiment is a scan-type projector that scans an object with light to form an image and is the same as the projector 1 according to the first embodiment except that the projector 9 includes an optical scanner 94 using the optical device according to the fifth embodiment of the invention.

That is, the projector 9 according to the present embodiment includes a light source apparatus 91, which outputs laser light or any other type of light, a cross dichroic prism 92, an optical scanner 93, which is responsible for primary scan, the optical scanner 94 (optical device according to the fifth embodiment of the invention), which is responsible for secondary scan, and a fixed mirror 95.

The light source apparatus 91 shown in FIG. 17 includes a red light source apparatus 911, which radiates red light, a blue light source apparatus 912, which radiates blue light, and a green light source apparatus 913, which radiates green light.

The cross dichroic prism 92 is an optical element that is formed by bonding four rectangular prisms to each other and combines the light fluxes radiated from the red light source apparatus 911, the blue light source apparatus 912, and the green light source apparatus 913 with one another.

The thus configured projector 9 operates as follows: each of the red light source apparatus 911, the blue light source apparatus 912, and the green light source apparatus 913 radiates a light flux based on image information from a host computer that is not shown; the cross dichroic prism 92 combines the light fluxes with one another; the combined light is incident on the optical scanners 93 and 94 and undergoes scan operation; the light having undergone the scan operation is reflected off the fixed mirror 95; and a color image is formed on the screen 8.

The optical scan performed by the optical scanners 93 and 94 will be specifically described.

The combined light from the cross dichroic prism 92 is first incident on the optical scanner 93 and undergoes horizontal scan (primary scan) operation. The light having undergone the horizontal scan operation is then incident on the optical scanner 94 and undergoes vertical scan (secondary scan) operation. A two-dimensional color image can thus be formed on the screen 8. Using the optical device according to the embodiment of the invention as the optical scanner 94 allows excellent drawing characteristics to be provided.

In the optical scanner 94, the optical member 202 can reflect light and deflect the optical path thereof. Since the embodiment of the invention allows unnecessary vibration of the optical member 202 to be effectively suppressed, the scan position on the screen 8, which is scanned by the optical scanner 94 with the light, can be exactly controlled. As a result, excellent drawing characteristics can be provided.

The configuration of the projector 9 is not limited to the configuration described above. For example, the fixed mirror 95 may be omitted as long as the optical scanners 93 and 94 scan an object with light and an image is formed on the object.

Further, the optical scanner 93 may also use the optical device according to the embodiment of the invention.

Sixth Embodiment

A head-mounted display using an image display apparatus according to a sixth embodiment of the invention will next be described.

Figure 18:
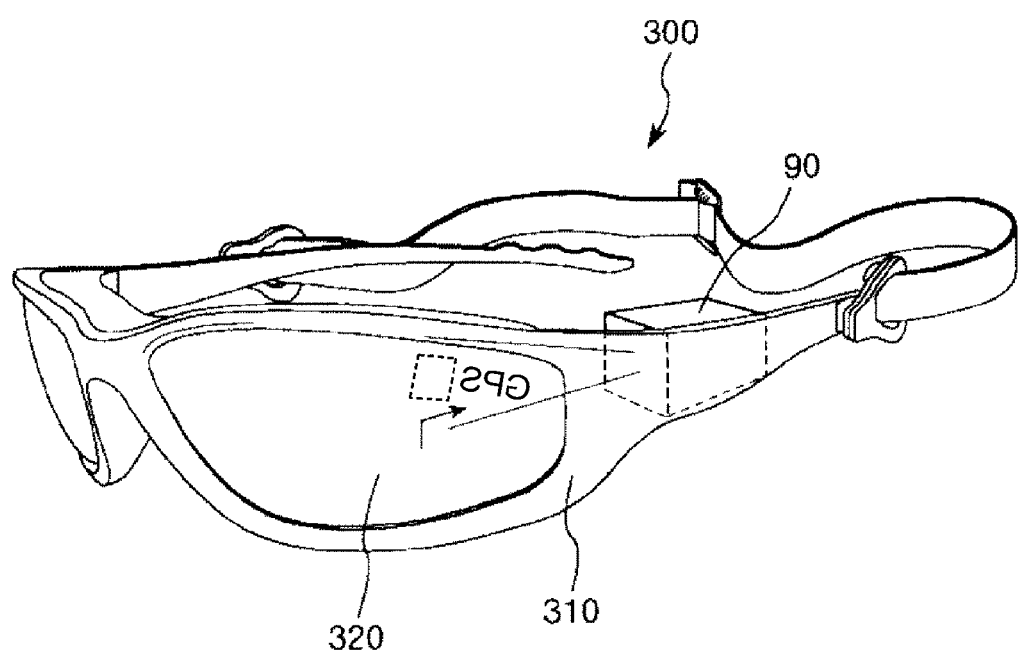
FIG. 18 is a perspective view showing a head-mounted display using an image display apparatus according to a sixth embodiment of the invention.

FIG. 18 is a perspective view showing a head-mounted display using the image display apparatus according to the sixth embodiment of the invention. In FIG. 18, the same configurations as those in the embodiments described above have the same reference characters.

A head-mounted display 300 shown in FIG. 18 includes glasses 310 and a video output section 90 mounted on the glasses 310. The video output section 90 has the same configuration as that of the projector 9 according to the fifth embodiment. The video output section 90 displays a predetermined image in a display section 320 provided in a portion of the glasses 310 where a lens is originally placed, and the predetermined image is viewed with one of the eyes.

The display section 320 may be transparent or opaque. When the display section 320 is transparent, information from the video output section 90 can be superimposed on and used with information from the outside environment.

The head-mounted display 300 may be provided with two video output sections 90 so that two display sections display images visually recognized by the two eyes.

The optical device and the image display apparatus according to the embodiments of the invention have been described with reference to the drawings, but the invention is not limited thereto. For example, in the optical device and the image display apparatus according to the embodiments of the invention, the configuration of each portion can be replaced with an arbitrary configuration having the same function, and other arbitrary configurations may be added to the embodiments of the invention.

Further, arbitrary two or more configurations (features) in the embodiments of the invention described above may be combined with each other.

The optical device according to any of the embodiments of the invention may also be used in an optical switch, an optical attenuator, and other optical apparatus as well as the optical path deflecting device described above.

The image display apparatus according to any of the embodiments of the invention may also be used in a printer, a head-up display (HUD), and other optical apparatus as well as the projector described above.

The entire disclosure of Japanese Patent Application No. 2014-065412, filed Mar. 27, 2014 is expressly incorporated by reference herein.

What is claimed is:

1. An optical device comprising:
   an optical member which is formed of a plate-shaped part and on which light is incident;
   a frame so provided that the frame surrounds side surfaces of the optical member and made of an elastic material more elastic than the optical member;
   a shaft that supports the optical member and the frame in a swingable manner and is made of the elastic material;
   a support that supports the shaft;
   a first restricting member provided on a plate surface of the optical member; and
   a second restricting member that is provided in a position separate from the optical member and comes into contact with the first restricting member when the optical member and the frame swing.

2. The optical device according to claim 1,
   wherein the first restricting member is provided in a position where the first restricting member overlaps with both the optical member and the frame when viewed in a direction perpendicular to the plate surface.

3. An image display apparatus comprising the optical device according to claim 2.

4. The optical device according to claim 1,
   wherein the elastic material is a material primarily containing a resin.

5. An image display apparatus comprising the optical device according to claim 4.

6. The optical device according to claim 1,
   wherein magnetic force produced between the first restricting member and the second restricting member induces swing motion of the optical member and the frame.

7. An image display apparatus comprising the optical device according to claim 6.

8. The optical device according to claim 6,
   wherein the first restricting member includes a permanent magnet, and the second restricting member includes an electromagnet.

9. An image display apparatus comprising the optical device according to claim 8.

10. The optical device according to claim 1,
    wherein the optical member transmits light.

11. An image display apparatus comprising the optical device according to claim 10.

12. The optical device according to claim 1,
    wherein the optical member reflects light.

13. An image display apparatus comprising the optical device according to claim 12.

14. An image display apparatus comprising the optical device according to claim 1.

15. The image display apparatus according to claim 14,
    wherein the optical device changes the position of an optical path of light that exits out of the optical device so that the position of a pixel displayed when irradiated with the light is shifted.

16. The image display apparatus according to claim 14,
    wherein the optical device scans an object with the light to form an image.

17. An optical device comprising:
    an optical member which is formed of a plate-shaped part and on which light is incident;
    a frame so provided that the frame surrounds side surfaces of the optical member and made of an elastic material more elastic than the optical member;
    a shaft that supports the optical member and the frame in a swingable manner and is made of the elastic material;
    a support that supports the shaft; and
    a restricting member that is provided in a position separate from the optical member and comes into contact with the optical member when the optical member and the frame swing.

18. The optical device according to claim 17,
    wherein the restricting member comes into contact with the frame when the optical member and the frame swing.

19. An image display apparatus comprising the optical device according to claim 18.

20. An image display apparatus comprising the optical device according to claim 17.

* * * * *